US008248609B2

(12) United States Patent
Wang et al.

(10) Patent No.: US 8,248,609 B2
(45) Date of Patent: Aug. 21, 2012

(54) CYLINDRICAL ILLUMINATION CONFOCAL SPECTROSCOPY SYSTEM

(75) Inventors: Tza-Huei Wang, Timonium, MD (US); Kelvin J. Liu, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 416 days.

(21) Appl. No.: 12/612,300

(22) Filed: Nov. 4, 2009

(65) Prior Publication Data

US 2010/0118300 A1 May 13, 2010

Related U.S. Application Data

(60) Provisional application No. 61/111,060, filed on Nov. 4, 2008.

(51) Int. Cl.
G01J 3/46 (2006.01)
(52) U.S. Cl. ...................................... 356/402
(58) Field of Classification Search .............. 356/402, 356/416
See application file for complete search history.

(56) References Cited

U.S. PATENT DOCUMENTS

| 4,990,795 A * | 2/1991 | Suzuki et al. ............. 250/574 |
| 2006/0209310 A1* | 9/2006 | Muenz et al. .............. 356/521 |
| 2006/0228747 A1* | 10/2006 | Fuchs et al. ................ 435/6 |
| 2007/0242269 A1* | 10/2007 | Trainer ..................... 356/336 |
| 2011/0171741 A1* | 7/2011 | Wang et al. ................. 436/94 |
| 2011/0287976 A1* | 11/2011 | Wang et al. ................. 506/12 |

OTHER PUBLICATIONS

Liu et al., "Quantitative Confocal Spectroscopy—Rectifying the Limitations of Single Molecule Detection", Jan. 2008, Proceedings of the 3rd IEEE International Conference on Nano/Micro Engineered and Molecular Systems, 1189-1192.*
Liu et al., "Cylindrical Illumination Confocal Spectroscopy: Rectifying the Limitations of Confocal Single Molecule Spectroscopy through One-Dimensional Beam Shaping", Sep. 2008, Biophysical Journal, vol. 95, 2964-2975.*
Agrawal, et al., "Real-time detection of virus particles and viral protein expression with two-color nanoparticle probes", J. Virol., vol. 79, pp. 8625-8628, 2005.
Camacho, et al., "Direct quantification of mRNA expression levels using single molecule detection". J. Biotechnol, vol. 107, pp. 107-114, 2004.
Cesaro-Tadic, et al., "High-sensitivity miniaturized immunoassays for tumor necrosis factor alpha using microfluidic systems", Lab on a chip, vol. 4, pp. 563-569, 2004.
Chen, et al., "The photon counting histogram in fluorescence fluctuation spectroscopy", Biophys. J., vol. 77, pp. 553-567, 1999.
Chou, et al., "A microfabricated device for sizing and sorting DNA molecules", Proceedings of the National Academy of Science, vol. 96, pp. 11-13, 1999.

(Continued)

*Primary Examiner* — Kara E Geisel
(74) *Attorney, Agent, or Firm* — Venable LLP; Henry J. Daley

(57) ABSTRACT

A cylindrical illumination confocal spectroscopy system has a fluidic device having a fluid channel defined therein, an objective lens unit arranged proximate the fluidic device, an illumination system in optical communication with the objective lens unit to provide light to illuminate a sample through the objective lens unit, and a detection system in optical communication with the objective lens unit to receive at least a portion of light that passes through the objective lens unit from the sample. The illumination system includes a beam-shaping lens unit constructed and arranged to provide a substantially planar illumination beam that subtends across, and is longer than, a lateral dimension of the fluid channel.

24 Claims, 16 Drawing Sheets

OTHER PUBLICATIONS

Craighead, H. "Future lab-on-a-chip technologies for interrogating individual molecules". Nature, vol. 442, pp. 387-393, 2006.
De Mello, et al., "Hydrodynamic focusing in microstructures: Improved detection efficiencies in subfemtoliter probe volumes", J. Appl. Phys., vol. 101, pp. 084903, 2007.
Dorre et al., "Highly efficient single molecule detection in microstructures", J. Biotechnol, vol. 86, pp. 225-236, 2001.
Dusch et al., "Three-dimensional point spread function model for line-scanning confocal microscope with high-aperture objective", J. Micnosc., vol. 228, pp. 132-138, 2007.
Enderlein et al., "Molecular shot noise, burst size distribution, and single-molecule detection in fluid flow: Effects of multiple occupancy", J. Phys. Chem. A, vol. 102, pp. 6089-6094, 1998.
Enderlein et al., "Statistics of single-molecule detection", J. Phys. Chem B., vol. 101, pp. 3626-3632, 1997.
Enderlein et al., "The statistics of single molecule detection: An overview", Bioimaging, vol. 5, pp. 88-98, 1997.
Filippova, et al., "Quantifying double-strand breaks and clustered damages in DNA by single-molecule laser fluorescence sizing", Biophys J. vol. 84, pp. 1281-1290, 2003.
Foquet, et al., "DNA fragment sizing by single molecule detection in submicrometer-sized closed fluidic channels", Anal. Chem., vol. 74, pp. 1415-1422, 2002.
Foquet et al., "Focal volume confinement by submicrometer-sized fluidic channels", Anal. Chem., vol. 76, pp. 1618-1626, 2004.
Goodwin et al., "Rapid sizing of individual fluorescently stained DNA fragments by flow cytometry", Nucl. Acids. Rex., vol. 21, pp. 803-806, 1993.
Goodwin et al., "Spatial dependence of the optical collection efficiency in flow-cytometry", Cytometry, vol. 21, pp. 133-144, 1995.
Ha, et al., "Initiation and re-initiation of DNA unwinding by the *Escherichia coli* Rep helicase", Nature, vol. 419, pp. 638-641, 2002.
Haab, et al., "Single-molecule detection of DNA separations in microfabricated capillary electrophoresis chips employing focused molecular streams", Anal. Chem. vol. 71, pp. 5137-5145, 1999.
Habbersett, et, al., "An analytical system based on a compact flow cytometer for DNA fragment sizing and single-molecule detection", Cytometry A, vol. 60, pp. 125-134, 2004.
Hess et al., "Focal volume optics and experimental artifacts in confocal fluorescence correlation spectroscopy", Biophys J., vol. 83, pp. 2300-2317, 2002.
Huisken et al., "Optical Sectioning Deep Inside Live Embryos by Selective Plane Illumination Microscopy", Science, vol. 305, pp. 1007-1009, 2004.
Li, et al., "Ultrasensitive coincidence fluorescence detection of single DNA molecules". *Anal. Chem.* vol. 75, pp. 1664-1670, 2003.
Lipman, et al., "Single-molecule measurement of protein folding kinetics", Science vol. 301, pp. 1233-1235, 2003.
Lyon et al., "Confinement and Detection of Single Molecules in Submicrometer Channels", Anal. Chem., vol. 69, pp. 3400-3405, 1997.
Piruska et al., "The autofluorescence of plastic materials and chips measured under laser irradiation", Lab on a chip, vol. 5, pp. 1348-1354, 2005.
Pons, et al., "Solution-phase single quantum dot fluorescence resonance energy transfer", J. Am. Chem. Soc., vol. 128, pp. 15324-15331, 2006.
Qian et al., "Analysis of confocal laser-microscope optics for 3-D fluorescence correlation spectroscopy", Appl. Optics, vol. 30, pp. 1185-1195, 1991.
Rigler et al., "Fluorescence correlation spectroscopy with high count rate and low-background—analysis of translational diffusion", Eur. Biophys J. Biophy, vol. 22, pp. 169-175, 1993.
Schrum, et. al., "Microchip flow cytometry using electrokinetic focusing", Anal. Chem. vol. 7, pp. 4173-4177, 1999.
Stavis et al., "Single molecule studies of quantum dot conjugates in a submicrometer fluidic channel", Lab on a chip, vol. 5, pp. 337-343, 2005.
Van Orden et al., "High-throughput flow cytometric DNA fragment sizing", Anal Chem., vol. 72, pp. 37-41, 2000.
Wabuyele, et al., "Approaching real-time molecular diagnostics: single-pair fluorescence resonance energy transfer (spFRET) detection for the analysis of low abundant point mutations in K-ras oncogenes", J. Am. Chem. Soc., vol. 125 pp. 6937-6945, 2003.
Wang, et al., "Single-molecule tracing on a fluidic microchip for quantitative detection of low-abundance nucleic acids", J. Am. Chem. Soc. vol. 127, pp. 5354-5359, 2005.
Werner, et al., "Increasing the resolution of single pair fluorescence resonance energy transfer measurements in solution via molecular cytometry", Anal. Chem., vol. 79, pp. 3509-3513, 2007.
Wolleschensky, et al.., "High-speed confocal fluorescence imaging with a novel line scanning microscope", J. Bioned Opt., vol. 11, pp. 064011, 2006.
Yan et. al., "Characteristics of different nucleic acid staining dyes for DNA fragment sizing by flow cytometry", Anal Chem., vol. 71, pp. 5470-5480, 1999.
Yokokawa et al., "Transcriptome analysis device based on liquid phase detection by fluorescently labeled nucleic acid probes", Biomedical micnrodevices, vol. 9, pp. 869-875, 2007.
Younan Xia, "Soft Lithography", Angewandle Chemie International Edition, vol. 37, pp. 550-575, 1998.
Zhang, et al., "Comparative quantification of nucleic acids using single-molecule detection and molecular beacons", The Analyst, vol. 130 pp. 483-488, 2005.
Huang et al., "Counting Low-Copy Number Proteins in a Single Cell", Science, Jan. 5, 2007, pp. 81-84, vol. 315.

* cited by examiner

CYLINDRICAL ILLUMINATION CONFOCAL SPECTROSCOPY SYSTEM

CROSS-REFERENCE TO RELATED APPLICATIONS

This application claims priority to U.S. Provisional Application No. 61/111,060 filed Nov. 4, 2008, the entire content of which is hereby incorporated by reference.

This invention was made using U.S. Government support under National Science Foundation Grant Nos. 0546012, 0730503 and 0725528.

SEQUENCE LISTING

The instant application contains a Sequence Listing which has been submitted via EFS-Web and is hereby incorporated by reference in its entirety. Said ASCII copy, created on Jan. 19, 2010, is named 02240279.txt, and is 539 bytes in size.

BACKGROUND

1. Field of Invention

The current invention relates to confocal spectroscopy systems and methods, and more particularly to cylindrical illumination confocal spectroscopy systems and methods.

2. Discussion of Related Art

Single molecule detection (SMD) allows the study of molecular properties without the bias of ensemble averaging. Although methods using scanning probe, resonant, and electrical sensors are being developed (Craighead, H. 2006. Future lab-on-a-chip technologies for interrogating individual molecules. *Nature* 442:387-393), it can also be performed using confocal spectroscopy, an optical detection method in which a collimated laser beam is focused into a diffraction-limited spot about 1 femtoliter in volume and used to excite single fluorescent molecules. While biomolecules are often tethered to solid substrates for in depth study of molecular dynamics, continuous flow systems can offer higher throughput and other advantages for quantitative applications. Herein, SMD will refer to confocal spectroscopy of molecules in free solution under continuous flow. SMD can be ideally suited as a platform for the detection of rare biomolecules such as nucleic acids (Li, H., L. Ying, J. J. Green, S. Balasubramanian, and D. Klenerman. 2003. Ultrasensitive coincidence fluorescence detection of single DNA molecules. *Anal. Chem.* 75:1664-1670; Camacho, A., K. Korn, M. Damond, J. F. Cajot, E. Litborn, B. Liao, P. Thyberg, H. Winter, A. Honegger, P. Gardellin, and R. Rigler. 2004. Direct quantification of mRNA expression levels using single molecule detection. *J. Biotechnol.* 107:107-114; Wabuyele, M. B., H. Farquar, W. Stryjewski, R. P. Hammer, S. A. Soper, Y. W. Cheng, and F. Barany. 2003. Approaching real-time molecular diagnostics: single-pair fluorescence resonance energy transfer (spFRET) detection for the analysis of low abundant point mutations in K-ras oncogenes. *J. Am. Chem. Soc.* 125:6937-6945; Zhang, C. Y., S. Y. Chao, and T. H. Wang. 2005. Comparative quantification of nucleic acids using single-molecule detection and molecular beacons. *The Analyst* 130:483-488), proteins, and small ligands (Pons, T., I. L. Medintz, X. Wang, D. S. English, and H. Mattoussi. 2006. Solution-phase single quantum dot fluorescence resonance energy transfer. *J. Am. Chem. Soc.* 128:15324-15331), the characterization of biomolecular interactions and molecular processes (Lipman, E. A., B. Schuler, O. Bakajin, and W. A. Eaton. 2003. Single-molecule measurement of protein folding kinetics. *Science* 301:1233-1235; Ha, T., I. Rasnik, W. Cheng, H. P. Babcock, G. H. Gauss, T. M. Lohman, and S. Chu. 2002. Initiation and re-initiation of DNA unwinding by the *Escherichia coli* Rep helicase. *Nature* 419:638-641), DNA sizing (Habbersett, R. C., and J. H. Jett. 2004. An analytical system based on a compact flow cytometer for DNA fragment sizing and single-molecule detection. *Cytometry A* 60:125-134), and pathogen detection (Agrawal, A., R. A. Tripp, L. J. Anderson, and S. Nie. 2005. Real-time detection of virus particles and viral protein expression with two-color nanoparticle probes. *J. Virol.* 79:8625-8628).

Although in principle SMD can be highly quantitative, its current implementations limit its accuracy, throughput, and practical applicability. The minute size of the SMD observation volume enables high signal-to-noise ratio detection of even single fluorescent molecules due to highly suppressed background levels. However, the diffraction-limited observation volume that enables SMD also significantly hampers its application in quantification and burst parameter determination. Since the observation volume in standard SMD is typically much smaller than the channel used for molecular transport, a condition of low mass detection efficiency is created where the large majority of molecules escape detection. We define the mass detection efficiency as the total proportion of molecules flowing through the channel that are detected. These mass detection efficiencies are usually 1% or less (Haab, B. B., and R. A. Mathies. 1999. Single-molecule detection of DNA separations in microfabricated capillary electrophoresis chips employing focused molecular streams. *Anal. Chem.* 71:5137-5145). For example, assuming 1) that all molecules passing within the observation volume are detected, 2) a radially symmetric, ellipsoidal, confocal observation volume with $1/e^2$ radii of 0.5×1 µm, and 3) detection within a 100 µm ID microcapillary, the resultant mass detection efficiency would be less than 0.05%. This necessitates extended data acquisition times and increased sample volumes for the detection of rare molecules (Wang, T. H., Y. H. Peng, C. Y. Zhang, P. K. Wong, and C. M. Ho. 2005. Single-molecule tracing on a fluidic microchip for quantitative detection of low-abundance nucleic acids. *J. Am. Chem. Soc.* 127: 5354-5359). In addition, since the observation volume profile is Gaussian in shape and highly non-uniform, a molecule's specific trajectory through the detection region will have a large influence on the emitted and collected fluorescence bursts, adding significant variability and uncertainty to not only the burst parameters but also their rate of detection.

The majority of approaches to rectify these short-comings have centered around controlling the molecular trajectory using either hydrodynamic (de Mello, A. J., and J. B. Edel. 2007. Hydrodynamic focusing in microstructures: Improved detection efficiencies in subfemtoliter probe volumes. *J. Appl. Phys.* 101:084903; Werner, J. H., E. R. McCarney, R. A. Keller, K. W. Plaxco, and P. M. Goodwin. 2007. Increasing the resolution of single pair fluorescence resonance energy transfer measurements in solution via molecular cytometry. *Anal. Chem.* 79:3509-3513) or electrokinetic (Haab, B. B., and R. A. Mathies. 1999. Single-molecule detection of DNA separations in microfabricated capillary electrophoresis chips employing focused molecular streams. *Anal. Chem.* 71:5137-5145; Wang, T. H., Y. H. Peng, C. Y. Zhang, P. K. Wong, and C. M. Ho. 2005. Single-molecule tracing on a fluidic microchip for quantitative detection of low-abundance nucleic acids. *J. Am. Chem. Soc.* 127:5354-5359; Schrum, D. P., C. T. Culbertson, S. C. Jacobson, and J. M. Ramsey. 1999. Microchip flow cytometry using electrokinetic focusing. *Anal. Chem.* 71:4173-4177) forces as well as nanochannel confinement (Foquet, M., J. Korlach, W. Zipfel, W. W. Webb, and H. G. Craighead. 2002. DNA fragment sizing by single molecule detection in submicrometer-sized closed fluidic channels. *Anal. Chem.* 74:1415-1422; Dorre, K., J. Stephan, M. Lapczyna, M. Stuke, H. Dunkel, and M. Eigen. 2001. Highly efficient single molecule detection in microstructures. *J. Biotechnol.* 86:225-236; Lyon, W. A., and S. Nie. 1997. Confinement and Detection of Single Molecules in Submicrometer Channels. *Anal. Chem.* 69:3400-3405). However, these approaches have limitations in their practical application due to effectiveness, throughput limitations, and ease of use, for example. Therefore, there remains a need for improved single molecule detection systems and methods.

SUMMARY

A cylindrical illumination confocal spectroscopy system according to an embodiment of the current invention has a fluidic device having a fluid channel defined therein, an objective lens unit arranged proximate the fluidic device, an illumination system in optical communication with the objective lens unit to provide light to illuminate a sample through the objective lens unit, and a detection system in optical communication with the objective lens unit to receive at least a portion of light that passes through the objective lens unit from the sample. The illumination system includes a beam-shaping lens unit constructed and arranged to provide a substantially planar illumination beam that subtends across, and is longer than, a lateral dimension of the fluid channel, the substantially planar illumination beam having a diffraction limited thickness in a direction substantially orthogonal to the lateral dimension of the fluid channel. The substantially planar illumination beam incident upon the fluidic device has a width that is substantially longer than the lateral dimension of the fluid channel such that the substantially planar illumination beam has an illumination intensity that is uniform across the lateral dimension of the fluid channel to within ±10%. The detection system comprises an aperture stop defining a substantially rectangular aperture having a longitudinal dimension and a transverse dimension. The aperture stop is arranged so that the substantially rectangular aperture is confocal with an illuminated portion of the fluid channel such that the transverse dimension of the substantially rectangular aperture substantially subtends the lateral dimension of the fluid channel without extending substantially beyond the fluid channel and allows light to pass from only a uniform excitation region while occluding light from outside the uniform excitation region, and the lateral dimension of the substantially rectangular aperture substantially matches the diffraction limited thickness of the planar illumination beam.

A method of detecting molecules according to an embodiment of the current invention includes causing a fluid with molecules to be detected to flow through a channel of a fluidic device, illuminating a portion of the fluid flowing through the channel substantially uniformly with a sheet-like beam of light, directing light from the molecules to be detected through a substantially rectangular aperture of an aperture stop to be detected, and detecting the molecules based on light directed through the substantially rectangular aperture. The substantially rectangular aperture is constructed and arranged to substantially match a width of the channel in one dimension and to substantially match a diffraction limited thickness of the sheet-like illumination beam in another dimension.

BRIEF DESCRIPTION OF THE DRAWINGS

FIGS. 5A-5F 1-D show Gaussian curve fits of the OV profiles shown in FIG. 4 for standard 488-SMD (left) and 488-CICS (right). The CICS profiles are similar to the standard SMD profiles in the y- and z-directions but appear substantially elongated in the x-direction. Good fits are obtained for all except CICS in the x-direction which is not expected to be Gaussian. A slightly better approximation of the curve shape can be obtained if a Lorentzian fit is used in the z-direction rather than a Gaussian fit. (Gaussian Fit: $y=y0+(A/(w*sqrt(PI/2)))*exp(-2*((x-xc)/w)^2)$.

DETAILED DESCRIPTION

Figure 1A:
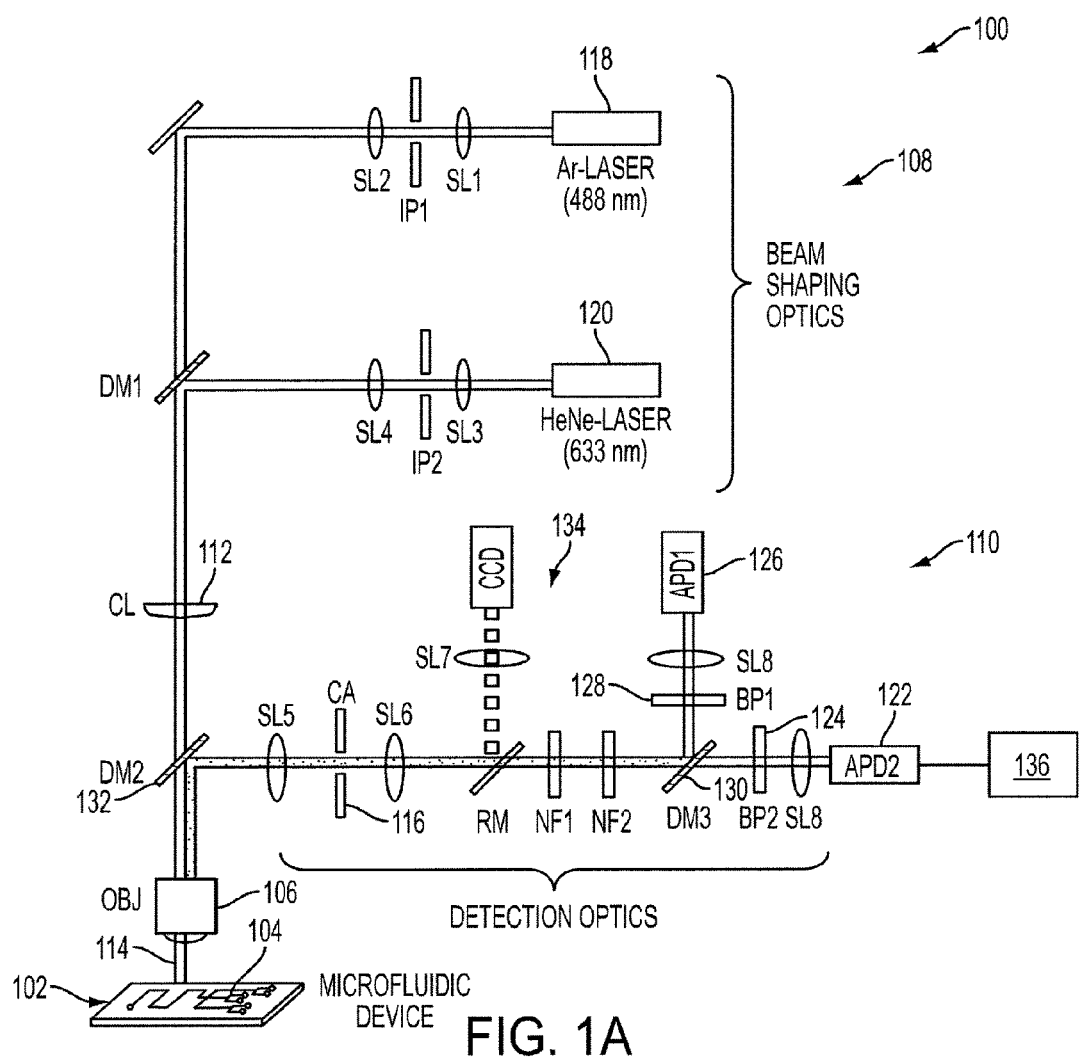
FIG. 1A is a schematic illustration a cylindrical illumination confocal spectroscopy (CICS) system according to an embodiment of the current invention.

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention.

All references cited herein are incorporated by reference as if each had been individually incorporated.

The terms light, optical, optics, etc are not intended to be limited to only visible light in the broader concepts. For example, they could include infrared and/or ultraviolet regions of the electromagnetic spectrum according to some embodiments of the current invention.

An embodiment of the current invention provides a confocal spectroscopy system that can enable highly quantitative, continuous flow, single molecule analysis with high uniformity and high mass detection efficiency. Such a system will be referred to as a Cylindrical Illumination Confocal Spectroscopy (CICS) system. CICS is designed to be a highly sensitive and high throughput detection method that can be generically integrated into microfluidic systems without additional microfluidic components.

Rather than use a minute, diffraction limited point, CICS uses a sheet-like observation volume that can substantially entirely span the cross-section of a microchannel. It is created through the 1-D expansion of a standard diffraction-limited detection volume from approximately 0.5 fL to 3.5 fL using a cylindrical lens. Large observation volume expansions in 3-D (>100×increase in volume) have been previously performed to directly increase mass detection efficiency and to decrease detection variability by reducing the effects of molecular trajectory (Wabuyele, M. B., H. Farquar, W. Stryjewski, R. P. Hammer, S. A. Soper, Y. W. Cheng, and F. Barany. 2003. Approaching real-time molecular diagnostics: single-pair fluorescence resonance energy transfer (spFRET) detection for the analysis of low abundant point mutations in K-ras oncogenes. *J. Am. Chem. Soc.* 125:6937-6945; Habbersett, R. C., and J. H. Jett. 2004. An analytical system based on a compact flow cytometer for DNA fragment sizing and single-molecule detection. *Cytometry A* 60:125-134; Filippova, E. M., D. C. Monteleone, J. G. Trunk, B. M. Sutherland, S. P. Quake, and J. C. Sutherland. 2003. Quantifying double-strand breaks and clustered damages in DNA by single-molecule laser fluorescence sizing. *Biophys. J.* 84:1281-1290; Chou, H.-P., C. Spence, A. Scherer, and S. Quake. 1999. A microfabricated device for sizing and sorting DNA molecules. *Proceedings of the National Academy of Sciences* 96:11-13; Goodwin, P. M., M. E. Johnson, J. C. Martin, W. P. Ambrose, B. L. Marrone, J. H. Jett, and R. A. Keller. 1993. Rapid sizing of individual fluorescently stained DNA fragments by flow cytometry. *Nucl. Acids Res.* 21:803-806). However, these approaches often still require molecular focusing and/or unnecessarily compromise sensitivity since observation volume expansion in the direction of molecular travel is superfluous. For example, much pioneering work has been performed by Goodwin et al. in reducing detection variability through a combination of 3-D observation volume expansion (1 pL) and hydrodynamic focusing. While highly sensitive and uniform, these flow cytometry based methods use an orthogonal excitation scheme that is ill suited to incorporation with microfluidic systems. Chou et al., on the other hand, have performed a 3-D observation volume expansion to increase uniformity in an epifluorescent format for DNA sizing in a PDMS microfluidic device. The large size of the observation volume (375 fL) reduces signal-to-noise ratio and limits sensitivity to the detection of large DNA fragments (>1 kbp). Rather than a large 3-D expansion, a smaller 1-D expansion can be used to increase mass detection efficiency and increase detection uniformity while having a reduced effect on signal-to-noise ratio and detection sensitivity. 1-D beam shaping using cylindrical lenses has been recently applied in selective plane illumination microscopy (Huisken, J., J. Swoger, F. Del Bene, J. Wittbrodt, and E. H. K. Stelzer. 2004. Optical Sectioning Deep Inside Live Embryos by Selective Plane Illumination Microscopy. *Science* 305:1007-1009), confocal line scan imaging (Ralf, W., Z. Bernhard, and K. Michael. 2006. High-speed confocal fluorescence imaging with a novel line scanning microscope. *J. Biomed. Opt.* 11:064011), imaging-based detection of DNA (Van Orden, A., R. A. Keller, and W. P. Ambrose. 2000. High-throughput flow cytometric DNA fragment sizing. *Anal. Chem.* 72:37-41), and fluorescence detection of electrophoretically separated proteins (Huang, B., H. K. Wu, D. Bhaya, A. Grossman, S. Granier, B. K. Kobilka, and R. N. Zare. 2007. Counting low-copy number proteins in a single cell. *Science* 315:81-84) but have not been thoroughly explored in SMD. We present CICS as a confocal SMD system and method in which the trade-off between observation volume size, signal-to-noise ratio, detection uniformity, and mass detection efficiency can be easily modeled and optimized through 1-D beam shaping.

Figure 1B:
FIG. 1B shows reflected images of the illumination volume of the system of FIG. 1A, but with no aperture.

FIG. 1A is a schematic illustration of a cylindrical illumination confocal spectroscopy system 100 according to an embodiment of the current invention. The cylindrical illumination confocal spectroscopy system 100 includes a fluidic device 102 having a fluid channel 104 defined therein, an objective lens unit 106 arranged proximate the fluidic device 102, an illumination system 108 in optical communication with the objective lens unit 106 to provide light to illuminate a sample through the objective lens unit 106, and a detection system 110 in optical communication with the objective lens unit 106 to receive at least a portion of light that passes through the objective lens unit 106 from the sample. The illumination system 108 includes a beam-shaping lens unit 112 constructed and arranged to provide a substantially planar illumination beam 114 that subtends across, and is wider than, a lateral dimension of the fluid channel 104. The substantially planar illumination beam has an intensity profile that is wide in one direction orthogonal to the direction of travel of the beam (the width) while being narrow, relative to the wide direction, in another direction substantially orthogonal to both the direction of travel of the beam and the wide direction (the thickness). This substantially planar illumination beam is therefore a sheet-like illumination beam. The beam-shaping lens unit 112 can include, but is not limited to, a cylindrical lens. The detection system 110 includes an aperture stop 116 that defines a substantially rectangular aperture having a longitudinal dimension and a transverse dimension. The aperture stop 116 is arranged so that the rectangular aperture is confocal with an illuminated portion of the fluid channel such that the longitudinal dimension of the rectangular aperture substantially subtends the lateral dimension of the fluid channel without extending substantially beyond the fluid channel. In other words, the longitudinal, or long dimension, of the rectangular aperture is matched to, and aligned with, the illuminated width of the fluid channel 104. The transverse, or narrow dimension, of the rectangular aperture remains size matched to the narrow dimension, or thickness, of the illuminated sheet. Although the aperture is referred to as being substantially rectangular, it can be shapes other than precisely rectangular, such as an oval shape. In other words, the "substantially rectangular aperture" is longer in one dimension than in an orthogonal dimension. FIG. 1B shows the illumination light spread out to provide a substantially planar illumination beam 114. By arranging the substantially planar illumination beam 114 so that it extends sufficiently beyond the edges of the fluid channel 104 the bright central portion can be centered on the fluid channel. The aperture stop 116 can then be used to block light coming from regions outside of the desired illuminated slice of the fluid channel 104. The dimension of the beam expansion, the aperture size, and fluid channel size can be selected to achieve uniform detection across the channel according to an embodiment of the current invention. The beam is expanded such that the uniform center section of the Gaussian intensity profile covers the fluid channel. The remaining, non-uniform section is filtered out by the substantially rectangular aperture. For example, the substantially planar illumination beam incident upon said fluidic device is uniform in intensity across said fluid channel to within ±10% according to an embodiment of the current invention. To ensure that molecules within the microchannels are uniformly excited irrespective of position, the 1D beam expansion can be performed such that the max-min deviation across the microchannel is <20% according to some embodiemnts of the current invention. This leads to an optical measurement CV of ±6.5% due to illumination non-uniformity alone. For higher precision measurements, greater beam expansion can be performed at the cost of additional wasted illumination power. For example, given the same microchannel, a larger beam expansion can be performed such that the max-min variation is <5%, an optical measurement CV of <2% can be obtained.

In an embodiment of the current invention, we can use a 5 μm wide microchannel, for example. The aperture can be 600×50 μm (width×height). Given an 83-fold magnification, when the aperture is projected into sample space it ends up being about 7 μm wide, 2 μm wider than the channel. The laser beam is expanded to a $1/e^2$ diameter of about 35 μm, 7-fold wider than the channel width, where the excitation is most uniform. Thus, we only collect from the center 7 μm of the total 35 μm. Then, molecules flow through 5 μm of the available 7 μm (i.e., the microchannel). The narrow dimension of the aperture is size matched to the narrow, diffraction limited width the illumination line in the longitudinal direction to maximize signal to noise ratio. This provides approximately 100% mass detection efficiency with highly uniform beam intensity across the microchannel. However, the broad concepts of the current invention are not limited to this particular example.

The fluidic device 102 can be, but is not limited to, a microfluidic device in some embodiments. For example, the fluid channel 104 can have a width and/or depth than is less than a millimeter in some embodiments. The fluidic device can be, but is not limited to, a microfluidic chip in some embodiments. This can be useful for SMD using very small volumes of sample material, for example. However, other devices and structures that have a fluid channel that can be arranged proximate to the objective lens unit 106 are intended to be included within the definition of the fluidic device 102. For single fluorophore analysis, a fluid channel that has a width less than about 10 μm and a depth less than about 3 μm has been found to be suitable. For brighter molecule analysis, a fluid channel that has a width less than about 25 μm and a depth less than about 5 μm has been found to be suitable. For high uniformity analysis, a fluid channel has a width less than about 5 μm and a depth less than about 1 μm has been found to be suitable.

The objective lens unit 106 can be a single lens or a compound lens unit, for example. It can include refractive, diffractive and/or graded index lenses in some embodiments, for example.

The illumination system 108 can include a source of substantially monochromatic light 118 of a wavelength selected to interact in a detectable way with a sample when it flows through said substantially planar illumination beam in the fluid channel 104. For example, the source of substantially monochromatic light 118 can be a laser of a type selected according to the particular application. The wavelength of the laser may be selected to excite particular atoms and/or molecules to cause them to fluoresce. However, the invention is not limited to this particular example. The illumination system 108 is not limited to the single source of substantially monochromatic light 118. It can include two or more sources of light. For example, the illumination system 108 of the embodiment illustrated in FIG. 1A has a second source of substantially monochromatic light 120. This can be a second laser, for example. The second source of substantially monochromatic light 120 can provide illumination light at a second wavelength that is different from the wavelength from the first laser in some embodiments. Additional beam shaping, conditioning, redirecting and/or combining optical components can be included in the illumination system 108 in some embodiments of the current invention. FIG. 1A shows, schematically, an example of some additional optical components that can be included as part of the illumination system 108. However, the general concepts of the current invention are not limited to this example. For example, rather than free space combination f the illumination beam, the two or more beams of illumination light can be coupled into an optical fiber, such as a multimode optical fiber, according to an embodiment of the current invention.

The detection system 110 has a detector 122 adapted to detect light from said sample responsive to the substantially monochromatic light from the illumination system. For example, the detector 122 can include, but is not limited to, an avalanche photodiode. The detection system can also include optical filters, such as a band pass filter 124 that allows a selected band of light to pass through to the detector 122. The pass band of the band pass filter 124 can be centered on a wavelength corresponding to a fluorescent wavelength, for example, for the sample under observation. The detection system 110 is not limited to only one detector. It can include two or more detectors to simultaneously detect two or more different fluorescent wavelengths, for example. For example, detection system 110 has a second detector 126 with a corresponding second band pass filter 128. A dichroic mirror 130 splits off a portion of the light that includes the wavelength range to be detected by detector 126 while allowing light in the wavelength range to be detected by detector 122 to pass through. The detection system 110 can include various optical components to shape, condition and/or otherwise modify the light returned from the sample. FIG. 1A schematically illustrates some examples. However, the general concepts of the current invention are not limited to the particular example illustrated.

The cylindrical illumination confocal spectroscopy system 100 also has a dichroic mirror 132 that allows at least a portion of illumination light to pass through it while reflecting at least a portion of light to be detected.

The cylindrical illumination confocal spectroscopy system 100 can also include a monitoring system 134 according to some embodiments of the current invention. However, the monitoring system 134 is optional.

In addition, the detection system can also include a signal processing system 136 in communication with the detectors 122 and/or 126 or integrated as part of the detectors.

The cylindrical illumination confocal spectroscopy system 100 can be used to analyze single molecules, beads, particles, cells, droplets, etc. according to some embodiments of the current invention. The single molecules, beads, cells, particles, droplets, etc. can incorporate an entity such as a fluorophore, microparticle, nanoparticle, bead, etc. that elicits an optical signal that can be detected by the cylindrical illumination confocal spectroscopy system 100 according to some embodiments of the current invention. However, the general concepts of the current invention are not limited to these particular examples.

EXAMPLES

Figure 1C:
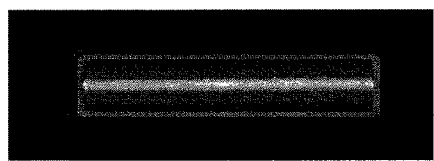
FIG. 1C corresponds to FIG. 1B, but a 620×115 μm rectangular aperture was included.
Figure 1D:
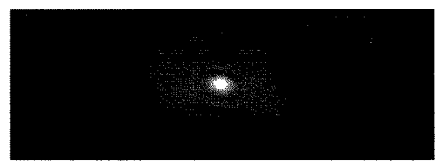
FIG. 1D is the case of conventional SMD with no pinhole. The conventional SMD illumination volume resembles a football that extends in and out of the plane of the page while the CICS observation volume resembles an elongated sheet or plane that also extends in and out of the page. The CICS observation volume is expanded in 1-D using a cylindrical lens (CL) and then filtered using a rectangular aperture (CA). In the absence of a confocal aperture in FIG. 1B, the CICS illumination profile is roughly Gaussian in shape along the x, y, and z axis, chosen to align with the width, length, and height of a microchannel, respectively. The addition of the confocal aperture in FIG. 1C, depicted as a rectangular outline, allows collection of fluorescence from only the uniform center section of the illumination volume. Abbreviations: SL—spherical lens, IP—illumination pinhole, CL—cylindrical lens, OBJ—objective, DM—dichroic mirror, CA—confocal aperture, BP—bandpass filter, RM—removable mirror, NF—notch filter, CCD—CCD camera, APD—avalanche photodiode

As depicted in FIG. 1A, high signal-to-noise detection can be enabled by the combination of a cylindrical lens (CL) 112 with a novel, microfabricated confocal aperture (CA) 116 according to an embodiment of the current invention. The cylindrical lens 112 is used to expand the illumination volume laterally in 1-D (along the x-direction or width) while remaining diffraction limited in the y-direction to maximize signal-to-noise ratio (FIG. 1B). Then, a confocal aperture is used to limit light collection to only the center section of the illumination volume (FIG. 1C). The microfabricated confocal aperture is neither round nor slit-like as in typical SMD but is rectangular and mimics the shape of the CICS observation volume. Whereas typical pinholes are nominally sized to the $1/e^2$ radius of the diffraction limited illumination volume (Centonze, V., and J. B. Pawley. 2006. Tutorial on Practical Confocal Microscopy and Use of the Confocal Test Specimen. In Handbook of Biological Confocal Microscopy. J. B. Pawley, editor. Springer, New York. 627-649), the CICS aperture is designed to occlude a much larger proportion of the illumination volume. Less than 30% of illumination volume in the x-direction is allowed to pass, such that a uniform, sheet-like observation volume is created. The final CICS observation volume is designed to be slightly larger than the accompanying microchannel in order to span the entire cross-section for uniform detection with near 100% mass detection efficiency, rectifying the limitations of traditional SMD without the drawbacks of molecular focusing or nanochannel confinement. This enables the resultant fluorescence bursts to not only be discrete but also to be so uniform they become digital in nature, ensuring accurate and robust quantification analysis.

CICS according to some embodiments of the current invention is shown to be superior to traditional SMD in accurate quantification and precise burst parameter determination. First, the limitations of traditional SMD and the potential benefits of CICS are theoretically explored using a combination of semi-geometric optics modeling and Monte Carlo simulations in the following examples. CICS is optimized for a 5×2 μm microchannel (w×h) and theoretically shown to have near 100% mass detection efficiency and <10% relative standard deviation (RSD) in the uniformity of detected fluorescence. Then, these models are validated using experimentally acquired observation volume profiles. Finally, CICS is implemented and demonstrated in two microfluidic systems through the detection of fluorescently stained DNA in a silicon device and a polydimethylsiloxane (PDMS) device and the detection of single Cy5 dye molecules in a PDMS device.

Materials and Methods

Numerical Simulation—Observation Volume

The observation volume (OV) profiles of confocal spectroscopy systems and their effects have been well explored in fluorescence correlation spectroscopy and SMD (Hess, S. T., and W. W. Webb. 2002. Focal volume optics and experimental artifacts in confocal fluorescence correlation spectroscopy. *Biophys. J.* 1 83:2300-2317; Enderlein, J., D. L. Robbins, W. P. Ambrose, and R. A. Keller. 1998. Molecular shot noise, burst size distribution, and single-molecule detection in fluid flow: Effects of multiple occupancy. *J. Phys. Chem. A* 102: 6089-6094; Enderlein, J., D. L. Robbins, W. P. Ambrose, P. M. Goodwin, and R. A. Keller. 1997. Statistics of single-molecule detection. *J. Phys. Chem. B* 101:3626-3632; Goodwin, P. M., W. P. Ambrose, J. C. Martin, and R. A. Keller. 1995. Spatial dependence of the optical collection efficiency in flow-cytometry. *Cytometry* 21:133-144; Rigler, R., U. Mets, J. Widengren, and P. Kask. 1993. Fluorescence correlation spectroscopy with high count rate and low-background-analysis of translational diffusion. *Eur. Biophys. J. Biophy.* 22:169-175; Qian, H., and E. L. Elson. 1991. Analysis of confocal laser-microscope optics for 3-D fluorescence correlation spectroscopy. *Appl. Optics* 30:1185-1195; Chen, Y., J. D. Muller, P. T. So, and E. Gratton. 1999. The photon counting histogram in fluorescence fluctuation spectroscopy. *Biophys. J.* 77:553-567). We adopt a simple semi-geometric optics approach previously used by Qian and Rigler to theoretically model and guide the design of the CICS system (see Observation Volume Modeling below).

The code for simulation of the OV profiles was written in Matlab (The Mathworks, Cambridge, Mass.). In both simulations, the total observation volume, 10×10.2×12 μm (x×y×z), was discretized into 0.05×0.15×0.05 μm (x×y×z) elements. The OV function was evaluated at each element and stored in a 3D array for analysis. The image space, 8×8 μm, was discretized into 0.02×0.02 μm elements. The constants used for standard SMD simulation were: $w_o$=0.5 μm, $P_o$=75 μm, M=83.3, n=1.47, λ=525 nm, NA=1.35, and $r_o$=0.5 μm. The constants used for CICS simulation were: $x_o$=25 μm, $y_o$=0.5 μm, $z_o$=5 μm, $P_o$=300 μm, M=83.3, n=1.47, λ=525 nm, NA=1.35, and $r_o$=0.5 μm.

Observation Volume Modeling

The observation volume profile OV(r,z) reflects the detected intensity of fluorescence from a molecule located at a specific point (r,z). It can be calculated from the collection efficiency CEF(r,z) and illumination intensity I(r,z) using:

$$OV(r,z) = CEF(r,z) \times I(r,z) \quad (1)$$

where r=(x,y). The z axis is taken as the optical axis while the x axis and y axis run perpendicular and parallel to the direction of flow, respectively.

The illumination profile I(r,z) for traditional SMD can be approximated by that of a focused laser beam using a Gaussian-Lorentzian function:

$$I(r,z) = \frac{2P}{\pi w^2(z)} \exp\left(-2\frac{r^2}{w^2(z)}\right) \quad (2)$$

where P accounts for the illumination power of the laser. The beam waist radius w(z) can be found using:

$$w^2(z) = w_o^2 + z^2 \tan^2 \delta, \quad (3)$$

$$w_o = \frac{\lambda}{n\pi \tan \delta}, \quad (4)$$

where λ is the laser wavelength, n is the index of refraction, and δ is the focusing angle of the laser beam at the $1/e^2$ radius.

For CICS, since the illumination profile is expanded in 1-D and no longer radially symmetric, a 3-D Gaussian function is used:

$$I(r,z) = P \exp\left[-2\left(\frac{x^2}{x_0^2} + \frac{y^2}{y_0^2} + \frac{z^2}{z_0^2}\right)\right] \quad (5)$$

where $x_o$, $y_o$, and $z_o$ are the beam waist radii in the x, y, and z directions, respectively.

The collection efficiency CEF(r,z) represents the proportion of light collected by a point emitter located at (r,z). In confocal optics, the collection efficiency can be expressed as the convolution of the microscope point spread function PSF (r',r,z) and the confocal aperture transmission function T(r'):

$$CEF(r,z) = \frac{1}{\Delta} \int T(r') PSF(r', r, z) dr' \quad (6)$$

where r' is the image space coordinate and Δ is the normalization factor:

$$\Delta = \int circ\left(\frac{r'}{s_o}\right) PSF(r', 0, 0) dr'. \quad (7)$$

The microscope PSF reflects the image of a point source located at (r,z). As long as a highly corrected microscope objective is used, the microscope PSF can be assumed to be isoplanatic and isochromatic. It is approximated using:

$$PSF(r', r, z) = \frac{circ\left(\frac{r'-r}{R(z)}\right)}{\pi R^2(z)} \quad (8)$$

$$R^2(z) = R_o^2 + z^2 \tan^2 \alpha \quad (9)$$

where $R_o$ is the resolution limit of the objective and the numerical aperture is defined by NA=n sin α.

The aperture transmission function used is:

$$T(r) = circ\left(\frac{r}{s_0}\right) \quad (10)$$

$$circ\left(\frac{r}{s_0}\right) = \begin{cases} 1 & \text{if } |r| \leq s_o \\ 0 & \text{if } |r| > s_0 \end{cases} \quad (11)$$

where $s_o$ is the pinhole radius in image space defined by $s_o = r_o/M$, $r_o$ is actual the pinhole radius, and M is the magnification at the pinhole. The same disk function is used for both traditional SMD and CICS simulations. The rectangular shape of the actual CICS aperture is not accounted for in the optical model. This leads to a slight overestimation of the background noise and underestimation of the signal variability.

Although using a semi-geometric optics model neglects higher order effects such as those resulting from diffraction and high-NA optics, the calculated OV profiles still provide a reasonable comparison between standard SMD and CICS as will be experimentally shown.

Numerical Simulation—Monte Carlo

Once the OV profiles are calculated, Monte Carlo simulations can be used to model the stochastic procession of molecules through the observation volume and the Poisson photoemission and detection process. This method is used to produce simulated single molecule trace data that can be analyzed in a manner identical to experimental data. During each time step, molecules are generated at random initial locations according to the concentration and propagated a distance in the y-direction according to the flow velocity.

The detected fluorescence intensity from a molecule at (r,z) can be calculated by:

$$I_f(r,z) = \beta_f OV(r,z) \Delta t \quad (12)$$

where $\Delta t$ is the integration time step and $\beta_f$ is a constant that accounts for factors such as the quantum yield and absorption coefficient of the fluorophore, the transmission of the optics, and the quantum efficiency of the detector.

The total collected fluorescence for all points within the observation volume can be found through integration over the entire volume:

$$I_f = \iiint \beta_f OV(r,z) dr dz \Delta t. \quad (13)$$

The same process can be repeated to calculate the background noise intensity by substituting the constant $\beta_n$ for $\beta_f$. The total collected intensity $I_t$ is given by:

$$I_t = I_f + I_n \quad (14)$$

The final signal, SMD, takes into account the Poisson photoemission and photodetection process:

$$SMD = Poi(Poi(I_t)) \quad (15)$$

Additional variability may be added to account for other sources of variability such as staining variability and variability in DNA length.

The Monte Carlo simulation was implemented in Matlab (The Mathworks, Cambridge, Mass.). Each fluorescent molecule has no volume and is assumed to be a point emitter. The models simulate 4 and 8 kb dsDNA stained at a 5:1 bp:dye ratio. The nominal DNA concentration was 1 pM unless otherwise indicated. A constant flow profile of v=1.5 mm/s was used in all simulations. Diffusion is ignored, and molecules travel in the y-direction only. A 0.1 ms time step was used, and all simulations were run for 100 s. Two data traces, one with and one without Poisson fluctuations in the photoemission and photodetection process, are stored, allowing accurate determination of mass detection efficiency. The signal-to-background ratio (SBR=average burst height/average background) was adjusted to match experimental data. In standard SMD, the simulation approximates the flow of molecules in a channel significantly larger than the observation volume. For CICS, a channel of 10.2×5×2 μm (l×w×h) was simulated.

CICS Instrumentation

All data were acquired with a custom-built, dual laser, dual detection channel, single molecule spectroscopy system capable of both traditional SMD and CICS with 488 nm and/or 633 nm laser illumination and detection at 520 nm and 670 nm. The beam from a 488 nm Arion laser (Melles Griot, Carlsbad, Calif.) was expanded, collimated, and filtered using two doublet lenses (f=50 mm and f=200 mm, Thorlabs, Newton, N.J.) and a 150 μm pinhole (Melles Griot, Carlsbad, Calif.) arranged as a Keplerian beam expander. The beam from a 633 nm He-Ne laser (Melles Griot, Carlsbad, Calif.) is also expanded and filtered using similar optics. The two beams are spatially aligned using beam steering mirrors mounted on gimbals (U100-G2K, Newport, Irvine, Calif.) and combined using a dichroic mirror (z633RDC, Chroma Technology, Rockingham, Vt.). The laser powers are individually adjusted using neutral density filters (Thorlabs, Newton, N.J.). In CICS mode, a cylindrical lens (f=300 mm, Thorlabs, Newton, N.J.) is used to shape the beam into a sheet and focused into the back focal plane of the microscope objective. The laser is then tightly focused by a 100×oil-immersion (1.4 NA) objective (100×UPlanFl, Olympus, Center Valley, Pa.). The fluorescence is collected by the same objective and spectrally separated from the excitation light using a second dichroic mirror (z488/633RPC, Chroma Technology, Rockingham, Vt.). It is passed through a confocal aperture, further separated into two detection bands by a third dichroic mirror (XF2016, Omega Optical, Brattleboro, Vt.) and filtered by bandpass filters (520DF40 and 670DF40, Omega Optical, Brattleboro, Vt.) before being imaged onto silicon avalanche photodiodes (APD) (SPCM-CD2801 and SPCM-AQR13, PerkinElmer Optoelectronics, Fremont, Calif.) with f=30 mm doublet lenses (Thorlabs, Newton, N.J.). Holographic notch filters (HNPF-488.0-1 and HNPF-633.0-1, Kaiser Optical Systems, Ann Arbor, Mich.) are also used to reduce the background from scattered light. Using an f=150 mm doublet tube lens (Thorlabs, Newton, N.J.), the total magnification at the pinhole is ~83×. For standard SMD, a circular pinhole (Melles Griot, Carlsbad, Calif.) is used but for CICS, a rectangular, microfabricated confocal aperture is used. Data is collected from the APDs by a PC using a PCI6602 counter/DAQ card (National Instruments, Austin, Tex.) that is controlled using software written in Labview (National Instruments, Austin, Tex.). Samples are positioned using a combination of a computer controlled, high resolution piezoelectric flexure stage (P-517.3CL, PI, Auburn, Mass.) and a manual XYZ linear stage (M-462, Newport, Irvine, Calif.). The entire system was built on a pneumatically isolated optical table (RS2000, Newport, Irvine, Calif.).

Microfabricated Confocal Aperture

The confocal aperture is fabricated from a 4" silicon wafer (300 μm thick, (1,0,0), SSP, p-type). 60 μm thick SPR220-7 (Shipley) is patterned using a triple spin coat and used as a masking material for a through wafer inductively coupled plasma/reactive ion etch (Trion Phantom RIE/ICP). The etch simultaneously forms the rectangular aperture and releases the die as a 9.5 mm diameter disk that can be mounted into a XYZθ-stage (RSP-1T and M-UMR5.25, Newport, Irvine, Calif.) for alignment. Apertures of 620×115 μm and 630×170 μm were used. Since the alignment of the aperture is critical to the observation volume uniformity, a RetigaExi CCD (QImaging Corporation, Surrey, BC, Canada) is used to guide the alignment. Image analysis is performed using IPLab (BD Biosciences Bioimaging, Rockville, Md.)

Single Molecule Trace Data Analysis

Data analysis is performed using software written in Labview. A thresholding algorithm is first used to discern fluorescence bursts from background fluctuations. The threshold can be set either at a constant value or in proportion to the background fluctuation levels. The identified bursts can then be individually analyzed for burst width, burst height, and burst size after a background correction is performed. No smoothing algorithms are applied.

OV Profile Acquisition

OV profile analysis was performed on the 488-SMD and 488-CICS systems. The experimental OV profiles were acquired by scanning a 0.24 μm yellow-green CML fluorescent bead (Invitrogen, Carlsbad, Calif.) through the OV using a high resolution piezoelectric stage (PI, Auburn, Mass.) and recording the resultant fluorescence intensity as a function of position. A low excitation laser power of 0.008 mW/cm$^2$ was used to minimize photobleaching. The fluorescent beads were diluted to a concentration of 2×10$^6$ beads/ml using DI water. A 5 µl drop of the diluted bead solution was placed onto a No. 1 thickness glass coverslip (Fisher Scientific) and allowed to dry. Then, the beads were covered with a thin layer of polydimethylsiloxane (PDMS, Dow Corning, Midland, Mich.) for protection (Cannell, M. B., A. McMorland, and C. Soeller. 2006. Practical Tips for Two-Photon Microscopy. In Handbook of Biological Confocal Microscopy. J. B. Pawley, editor. Springer, New York. 900-905). Beads were imaged from the backside through the glass. A rough 100×100 µm (x×y) scan was used to locate individual beads. Once an isolated bead was found, it was scanned in 0.15×0.15×0.15 µm (x×y×z) steps over a 4×4×8 µm volume for standard SMD and in 0.25×0.15×0.15 µm steps over a 12×6×10 µm volume for CICS. The fluorescence intensity was binned in 1 ms intervals and averaged over 25 ms at each point.

pBR322 DNA Preparation

For 488-SMD and 488-CICS analysis, pBR322 DNA (New England Biolabs, Ipswich, Mass., 4.3 kbp) was stained with PicoGreen (Invitrogen, Carlsbad, Calif.) using the protocol developed by Yan (Yan, X. M., W. K. Grace, T. M. Yoshida, R. C. Habbersett, N. Velappan, J. H. Jett, R. A. Keller, and B. L. Marrone. 1999. Characteristics of different nucleic acid staining dyes for DNA fragment sizing by flow cytometry. *Anal. Chem.* 71:5470-5480). The DNA was diluted to 100 ng/mL in TE buffer and stained with 1 µM PicoGreen for 1 hour in the dark. It was then further diluted down to 1 pM in TE buffer for measurement. For 633-SMD and 633-CICS analysis, pBR322 DNA was stained with TOTO-3 (Invitrogen, Carlsbad, Calif.). The DNA was diluted to 100 ng/mL in TE buffer and stained with TOTO-3 at a 5:1 base pair:dye ratio for 1 hour in the dark. It was then further diluted down to 1 pM in TE buffer for measurement.

Cy5 Oligonucleotide Preparation

Single Cy5 5' end-labeled 24 by ssDNA (Integrated DNA Technologies, Coralville, Iowa, Cy5-5'-AAGGGATTC-CTGGGAAAACTGGAC-3' (SEQ ID NO: 1)) was resuspended in DI water and diluted to 1 pM concentration in filtered TE buffer for measurement.

633-SMD/Cy5 Analysis in a Microcapillary

A flow cell was fabricated using 100 µm ID fused silica microcapillary tubing (Polymicro Technology, Phoenix, Ariz.). A syringe pump (PHD2000, Harvard Apparatus, Holliston, Mass.) was used to drive the Cy5 labeled oligonucleotide through the flow cell at a volumetric flow rate of 1 µl/min. The input laser power was 0.185 mW/cm$^2$, and a 1 ms photon binning time was used. A typical trace consists of 300 s of data.

488-CICS pBR322 /PicoGreen-DNA Analysis in Silicon Microfluidics

For 488-CICS analysis of pBR322 DNA, the cylindrical lens is inserted into the beam path, and the circular pinhole is swapped for a 620×115 µm rectangular confocal aperture. A microfluidic device was fabricated from silicon. First, 500× 5×2 µm (l×w×h) channels were etched into a 4", 500 µm thick, SSP, p-type, (1,0,0) silicon wafer using reactive ion etching and photoresist as a masking material. After etching, 0.8 mm through wafer fluidic vias were drilled into the silicon substrate using an abrasive diamond mandrel. Then, the channels were sealed by anodic bonding of 130 µm thick borosilicate glass (Precision Glass and Optics, Santa Ana, Calif.). Finally, Nanoport (Upchurch, Oak Harbor, Wash.) fluidic couplings were epoxied to the backside. A syringe pump was used to drive sample through the device at a typical volumetric flow rate of 0.001 µl/min such that the flow velocity was comparable to that of standard SMD. A 0.1 ms bin time was used. A typical trace consists of 300 s of data. The input laser power was 0.08 mW/cm$^2$.

633-CICS and 633-SMD/TOTO-3-DNA and Cy5 Oligonucleotide Analysis in PDMS Microfluidics For 633-CICS analysis of both TOTO-3 stained pBR322 DNA and Cy5, a 630×170 µm confocal aperture was used. Standard soft-lithography techniques (Younan Xia, G. M. W. 1998. Soft Lithography. *Angewandte Chemie International Edition* 37:550-575) were used to create 500×5×2 µm (l×w× h) PDMS channels bonded to #1 glass cover slips (Fisher Scientific, Pittsburg, Pa.). A syringe pump was used to drive sample through the device at a volumetric flow rate of 0.001 µl/min such that the flow velocity was comparable to that of standard SMD. A 0.1 ms bin time was used in the pBR322 DNA analysis while a 1 ms bin time was used in the Cy5 oligonucleotide analysis. A typical trace consists of 300 s of data. 1.85 mW/cm$^2$ and 0.057 mW/cm$^2$ illumination powers were used for CICS and SMD analysis of pBR322 DNA, respectively. 3.7 mW/cm$^2$ and 0.185 mW/cm$^2$ illumination powers were used for CICS and SMD analysis of Cy5 oligonucleotide, respectively.

Results

Observation Volume Modeling

Individual molecules that traverse the observation volume of CICS are detected uniformly irrespective of location or trajectory whereas fluorescent signals that are detected using traditional SMD are a strong function of molecular trajectory. It is this enhancement in observation volume uniformity that can enable CICS to be significantly more accurate, precise, and quantitative than traditional SMD. A semi-geometric optics model is used to theoretically compare the OV profiles of CICS with traditional SMD. FIGS. 2A-2F show the calculated illumination, collection efficiency, and OV profiles for standard SMD and CICS.

Figure 2B:
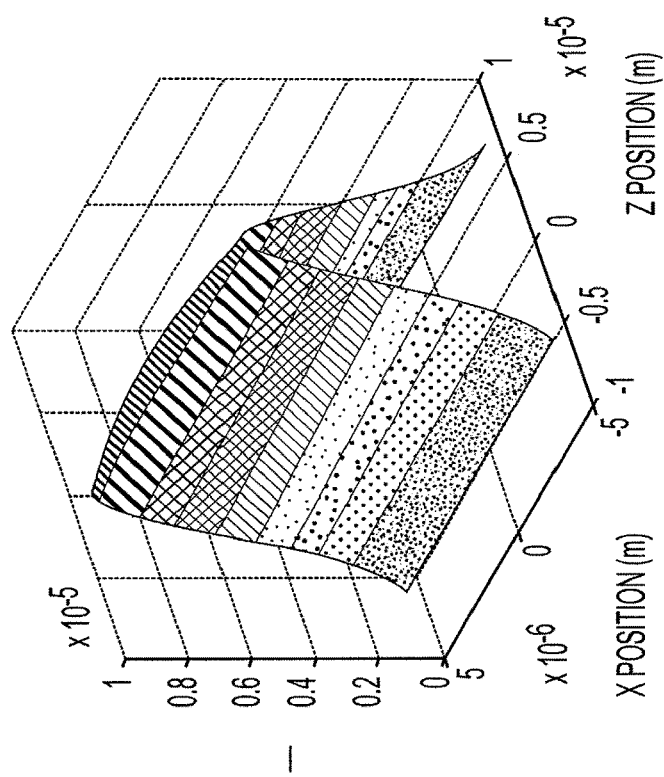
FIGS. 2A-2F show the illumination, I (top), collection efficiency, CEF (middle), and observation volume, OV (bottom), profiles of traditional SMD (left) and CICS (right) calculated using a semi-geometric optics model. The profiles are illustrated as xz-plots. Traditional SMD has a small OV profile that varies sharply in the x- and z-directions while the CICS OV profile has a smooth plateau region that varies minimally. The units of illumination profile and OV profile are arbitrary units (AU).
Figure 2A:
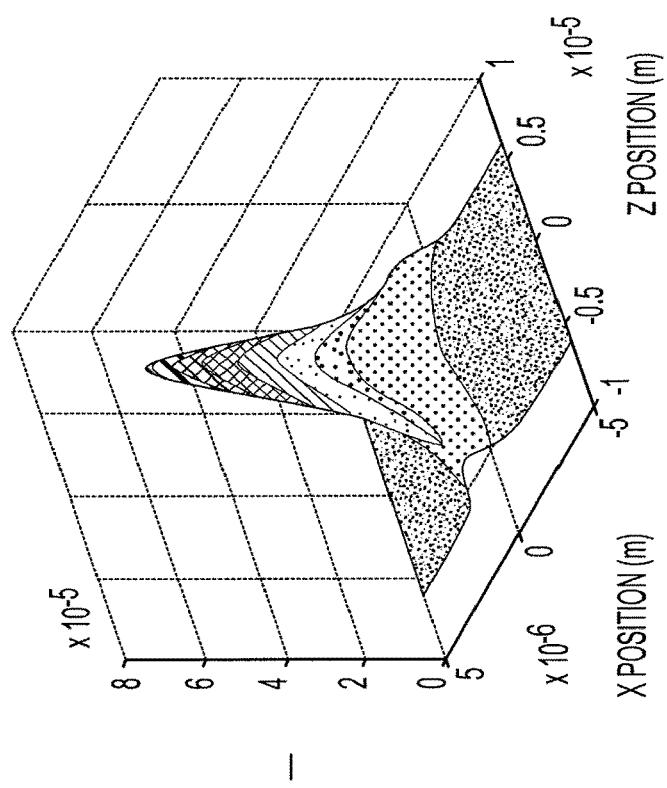
Figure 2D:
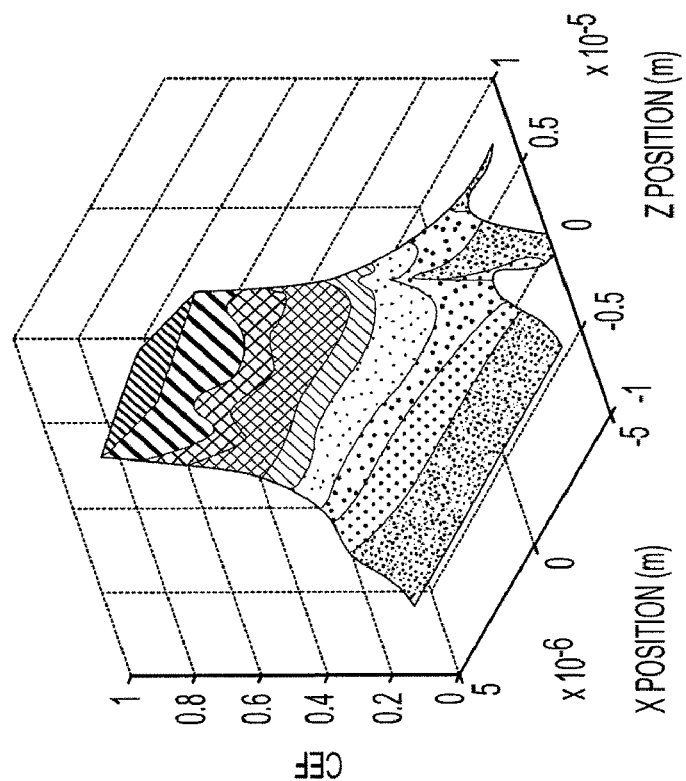
Figure 2C:
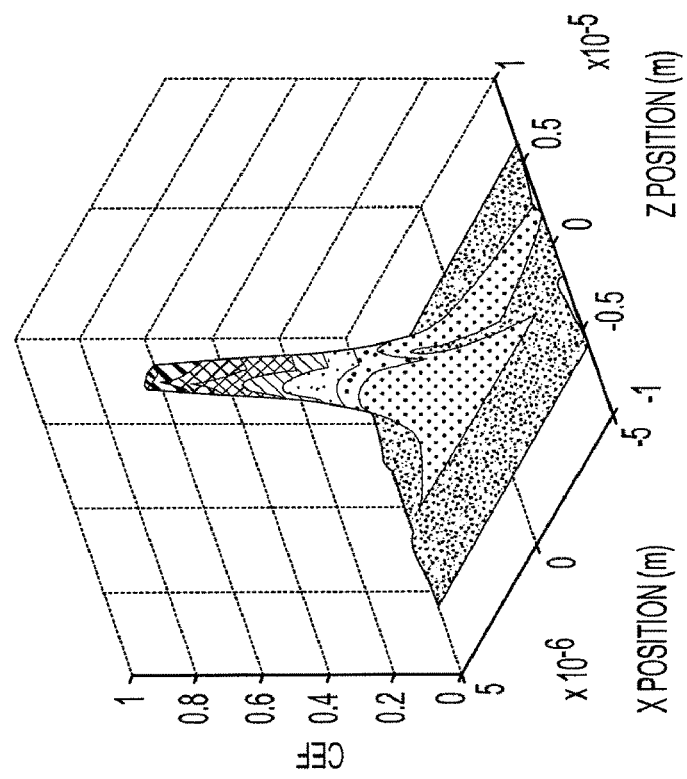

The increased uniformity of CICS is created by two key modifications to the standard confocal spectroscopy system. Standard SMD has a diffraction limited illumination profile that is radially symmetric and has a 1/e$^2$ radius of approximately 0.5 µm (FIG. 2A). By using an appropriate cylindrical lens, this radius can be elongated in 1-D to approximately 25 µm to form a sheet of excitation light rather than a point (FIG. 2B). Since the illumination profile is expanded in 1-D perpendicular to flow only, noise from background is minimized while uniformity and mass detection efficiency are increased. Standard SMD also uses a small pinhole (~100 µm) such that the collection efficiency decays sharply at regions away from the confocal point (FIG. 2C). In CICS, a large pinhole or aperture (~600 µm) is used such that fluorescence can be uniformly collected from the entire 7×2 µm (w×h) center plateau region (FIG. 2D). However, with a standard pinhole the stray light is no longer optimally apertured due to the geometric discrepancy between the circular pinhole and the sheet-like illumination. For optimal results, a microfabricated rectangular aperture is used as subsequently described.

Figure 2F:
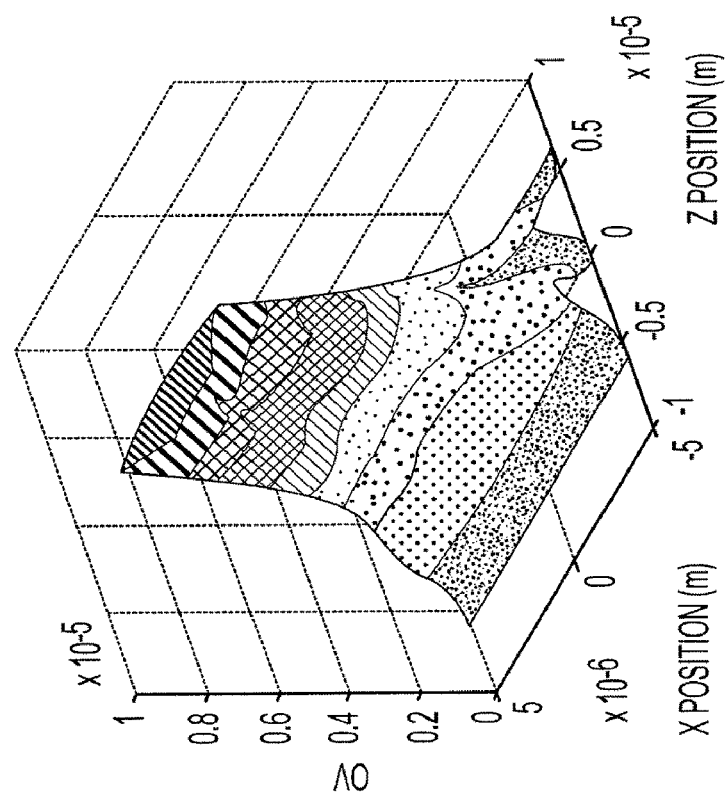
Figure 2E:
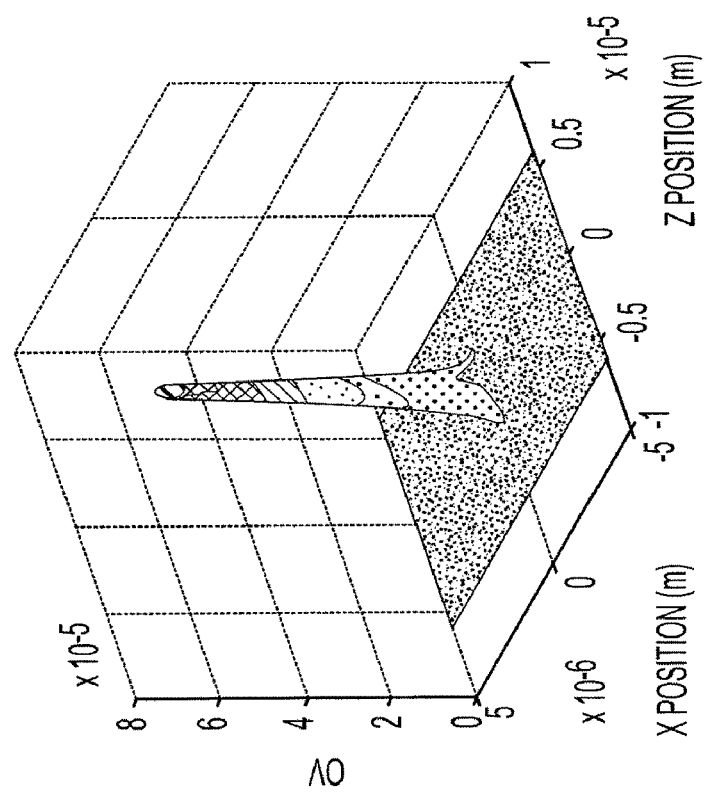

As shown in FIG. 2E, the result of the diffraction limited illumination profile and the sharply decaying collection efficiency is that traditional SMD has an OV profile that is nearly Gaussian in shape and varies sharply with position. Molecules that traverse the center of the observation volume result in much larger fluorescence bursts than molecules that travel through the edges, creating a train of highly variable single molecule bursts due to the typically random distribution of molecules in solution. This intrinsic variability makes accurate determination of burst parameters or burst frequency difficult. Conversely, due to the broad illumination profile and the uniform collection efficiency, FIG. 2F shows that the OV profile of CICS has a large plateau region of approximately 7×2 µm (w×h) where both excitation and detection occur in an extremely uniform manner. Over this plateau region, the detected fluorescence intensity is expected to have less than 10% RSD due to optical variation. Unlike standard SMD which requires nanochannel confinement (e.g. 0.35×0.25 µm, w×h) to achieve comparable performance (Foquet, M., J. Korlach, W. R. Zipfel, W. W. Webb, and H. G. Craighead. 2004. Focal volume confinement by submicrometer-sized fluidic channels. *Anal. Chem.* 76:1618-1626), CICS can be performed within a much larger microchannel (5×2 µm, w×h, >100×increase in cross-sectional area). Since the optimal microchannel is slightly smaller than the CICS observation volume, digital fluorescence bursts will be detected with near 100% mass detection efficiency.

Monte Carlo Simulations

Figure 3A:
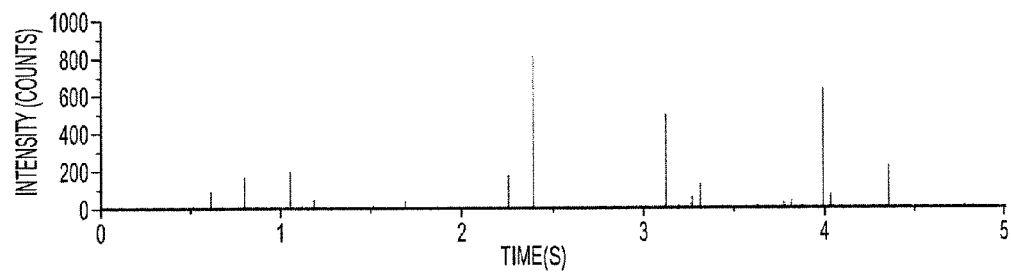
FIGS. 3A and 3B show simulated single molecule trace data of FIG. 3A standard SMD and FIG. 3B CICS performed using Monte Carlo simulations and the theoretical OV profiles. CICS displays a significant increase in burst rate and burst height uniformity over traditional SMD. An increase in background noise is also evident. The bin time was 0.1 ms.
Figure 3B:
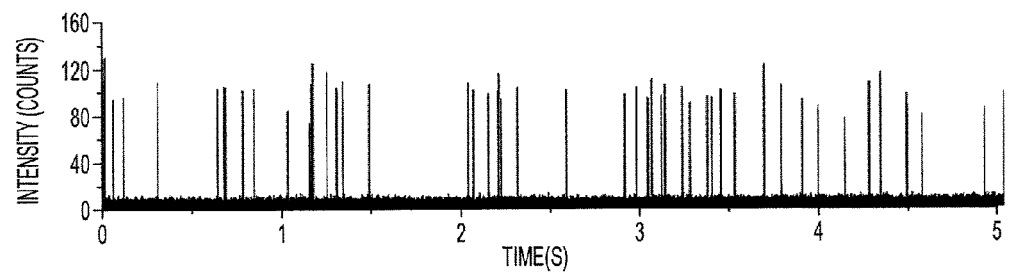

To further explore the effects of the observation volume non-uniformity and molecular trajectory, the Monte Carlo method is used to generate simulated single molecule traces based on the theoretical OV profiles in FIGS. 2A-2F. Fluorescent molecules are generated at random initial locations and propagated through the observation volume according to the flow profile. During each time step, the fluorescence signal arising from all molecules within the observation volume as well as the background signal is integrated. FIGS. 3A and 3B, respectively, depict two simulated traces for a prototypical embodiment of traditional SMD performed within a channel that is larger than the observation volume and CICS performed within a 5×2 µm (w×h) microchannel. As expected, traditional SMD shows a smaller number of highly variable bursts due to the non-uniform OV profile while CICS shows a larger number of highly uniform bursts that appear digital due to the smooth plateau region.

The burst rate of CICS increases in direct proportion to the 1-D expansion. The large enhancement in mass detection efficiency is achieved through the combination of this increase in burst rate due to the observation volume expansion and the use of a microchannel that is size matched to the observation volume. The mass detection efficiency can be accurately analyzed in the simulation through a comparison of all randomly generated molecules against those detected after thresholding. When a discrimination threshold of 30 counts is applied, the mass detection efficiency of CICS within the 5×2 µm channel (w×h) is 100% with no false positives or false negatives due to the digital nature of the fluorescence bursts. If the channel size is further increased to 7×3 µm (w×h), the mass detection efficiency remains at 100% but the burst height variability increases from 13% RSD to 26% RSD, illustrating the tradeoff between observation volume size, throughput, and detection uniformity (data not shown).

In fact, the variability in burst height is no longer dominated by non-uniformity in the OV profile but rather the Poisson photoemission and detection process. Although the uniformity can be improved by changing the collimation optics and aperture should a larger observation volume be necessary, there will be a concurrent decrease in signal-to-noise ratio that is unavoidable. Further improvements must be found by increasing the fluorescence intensity through higher illumination powers or from longer photon binning times instead of optical modifications.

In contrast, since traditional SMD is usually performed within a channel that is much larger than the observation volume, it has an extremely low mass detection efficiency. For example, given a 100 µm ID microcapillary, the mass detection efficiency is less than 0.05% under the same threshold. This low mass detection efficiency is due to a combination of the minute observation volume, observation volume non-uniformity, thresholding artifacts, and Poisson fluctuations. The large majority of molecules (>99.6%) escape detection because of the size mismatch between the observation volume and the microcapillary. The remainder of the molecules (~0.3%) is missed since their corresponding fluorescence bursts reside below the threshold and are indistinguishable from background fluctuations. To obtain 100% mass detection efficiency using standard SMD, nanochannel confinement or molecular focusing of molecules to a stream width of <<1 µm would be necessary.

Detailed analysis of the Monte Carlo data reveals that when thresholding algorithms are used to discriminate fluorescence bursts from background fluctuations, as is common practice, the quantification accuracy of traditional SMD is compromised due to thresholding artifacts. The burst rate is defined as the rate at which fluorescence bursts are detected and is proportional to the concentration of molecules in the sample as well as the sample flow rate and mass detection efficiency. The burst height is then defined as the maximum number of photon counts per bin time emitted by a molecule during a transit event. It is related to the brightness of the molecule, the observation volume uniformity, the flow rate, and photon binning time. The wide distribution of burst heights in standard SMD causes the burst rate and determined burst parameters to vary widely with the specific threshold applied as shown in Table 1. As the threshold is increased, the smaller bursts are progressively excluded, gradually decreasing the burst rate and shifting the average burst height upwards. Accurate determination of the absolute burst rate and burst height is extremely difficult since it is nearly impossible to distinguish between small fluorescence bursts arising from molecules that traverse the periphery of the observation volume and random background fluctuations. In contrast, since CICS bursts are uniform in size, they are much more robust when used with thresholding algorithms. The applied threshold can vary over a wide range without affecting either the burst rate or determined burst parameters. This is due to the digital nature of the fluorescence bursts. The average burst height determined using CICS remains extremely constant as the threshold is varied from 20 to 70 counts, increasing only 4% whereas the average burst height determined using traditional SMD increases 100%.

TABLE 1

Thresholding artifacts in traditional SMD versus CICS

| | Traditional SMD | | CICS | |
|---|---|---|---|---|
| Threshold (counts) | Burst Rate/100 s | Burst Height (counts) | Burst Rate/100 s | Burst Height (counts) |
| 20 | 421 | 149 ± 199 | 958 | 101 ± 24 |
| 30 | 305 | 197 ± 216 | 906 | 105 ± 14 |
| 40 | 257 | 227 ± 223 | 906 | 105 ± 14 |
| 50 | 224 | 254 ± 226 | 906 | 105 ± 14 |
| 60 | 206 | 272 ± 229 | 906 | 105 ± 14 |
| 70 | 183 | 298 ± 229 | 903 | 105 ± 14 |

Analysis of 100 s Monte Carlo simulation data. The digital nature of fluorescence bursts acquired using CICS allows the system to be robust against thresholding artifacts. However, quantitative burst parameters determined using traditional SMD are highly sensitive to the specific threshold applied. The bin time was 0.1 ms.

Matters are further complicated when molecules of varying brightness need to be quantified using the burst rate. Two populations of molecules of equal concentration but different brightness levels can give significantly different burst rates even if the same threshold is applied, necessitating precise calibration for each molecular species. These effects are illustrated in Table 2. The simulated DNA is stoichiometrically stained such that the number of incorporated dye molecules and, hence, brightness increases linearly with DNA length. Although the total quantity of DNA is conserved in all cases, the burst rate of standard SMD can vary by almost 40% when presented with only a 2× increase in DNA length. With standard SMD, it is impossible to determine concentration based on burst rate alone. Prior knowledge of the sample composition is necessary to provide an accurate reference standard. When an unknown mixture of molecules of varying brightness is present, such calibrations are often infeasible as it becomes impossible to independently separate the effects of brightness and concentration. CICS, however, is highly robust even when quantifying mixtures of molecules as shown in Table 2. A constant quantity of DNA is reflected even in the presence of varying mixtures. The burst rates differ by less than 5% in the same situation, implicating that concentration can be blindly determined based on burst rate alone.

TABLE 2

Single molecule burst rates in varying DNA mixtures

|  | 1 pM 4 kbp | 1 pM 8 kbp | 0.5 pM 4 kbp + 0.5 pM 8 kbp | 0.25 pM 4 kbp + 0.75 pM 8 kbp |
|---|---|---|---|---|
| Traditional SMD | 305 | 420 | 381 | 410 |
| CICS | 915 | 928 | 948 | 922 |

Simulated burst rate of DNA mixtures taken using traditional SMD and CICS. The burst rate of traditional SMD varies as relative proportions of the two DNA components are varied although the total concentration is conserved in all cases. The CICS burst rate remains consistent across the mixtures. The applied threshold was 30 counts, and the bin time was 0.1 ms.

These Monte Carlo simulations have theoretically shown that the 1-D expansion of the observation volume and increase in observation volume uniformity provide the basis for CICS to achieve 100% mass detection efficiency within a microchannel and to perform highly accurate and robust burst parameter analysis. CICS rectifies the limitations of traditional SMD while still preserving single molecule sensitivity.

Experimental Observation Volume Mapping

Figure 4A:
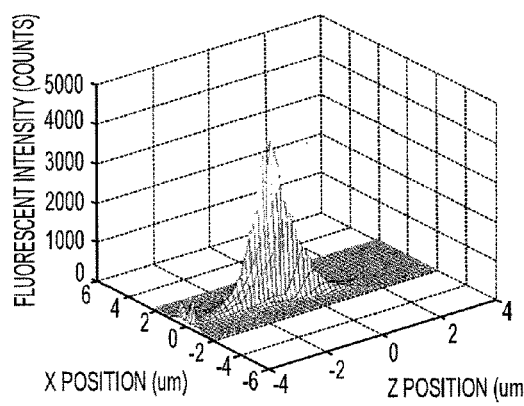
FIGS. 4A and 4B show OV profiles of FIG. 4A traditional SMD and FIG. 4B CICS acquired using a sub-micron fluorescent bead. The CICS observation volume resembles traditional SMD in the z-direction but is elongated in the x-direction such that it can span a typical microchannel.
Figure 4B:
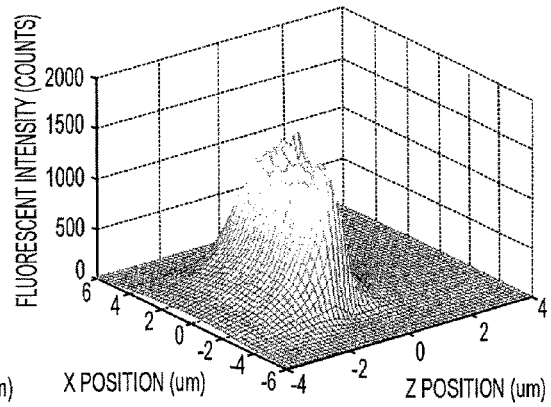
Figure 5A:
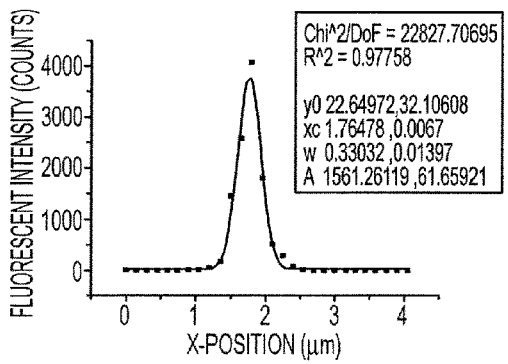

The OV profiles of the 488-SMD and the 488-CICS systems were acquired by rastering a sub-micron fluorescent bead through the observation volume and recording the collected fluorescence intensity as a function of position. FIGS. 4A and 4B, show xz-plots that track the theoretical predictions of FIGS. 2A-2F. Standard SMD has a small, sharply decaying OV profile that can be accurately modeled using a 3-D Gaussian approximation. Excellent fits to Gaussian functions were obtained resulting in measured $1/e^2$ radii of 0.33, 0.44, and 0.99 µm in the x, y, and z directions, respectively; this leads to an observation volume size of 0.6 fL (see FIGS. 5A, 5C and 5E). However, the observation volume is not perfectly symmetrical and contains some aberrations. These are likely due to artifacts caused by optical aberrations, misalignment of optical components, mechanical drift and instability of the scanning stage, and photobleaching of the fluorescent bead.

Figure 5B:
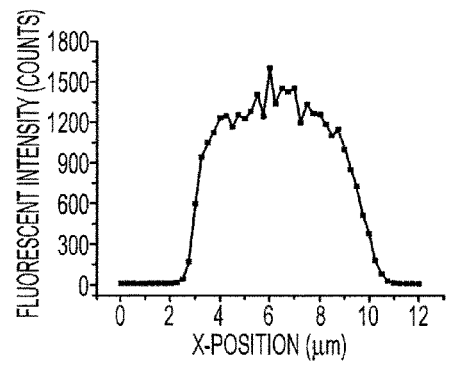
Figure 5C:
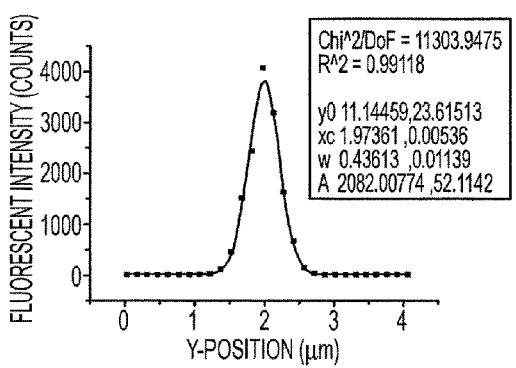
Figure 5D:
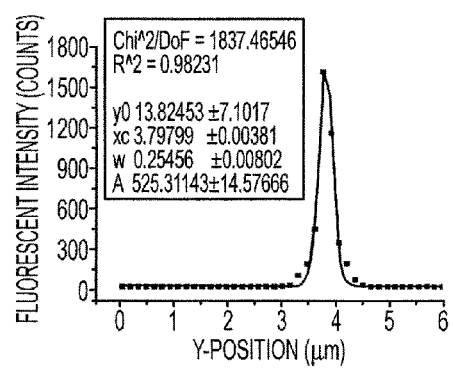
Figure 5E:
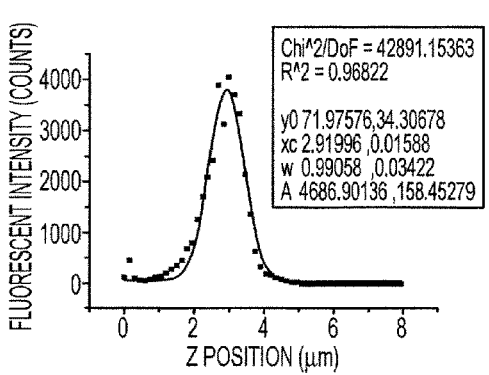
Figure 5F:
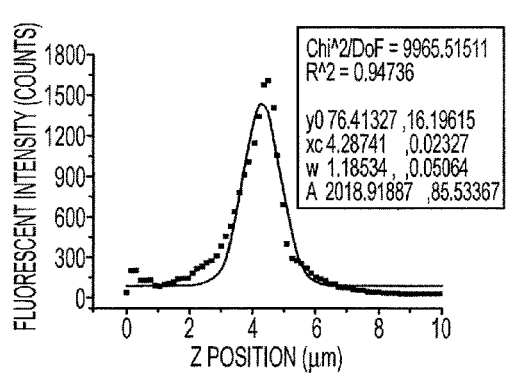
Figure 6:
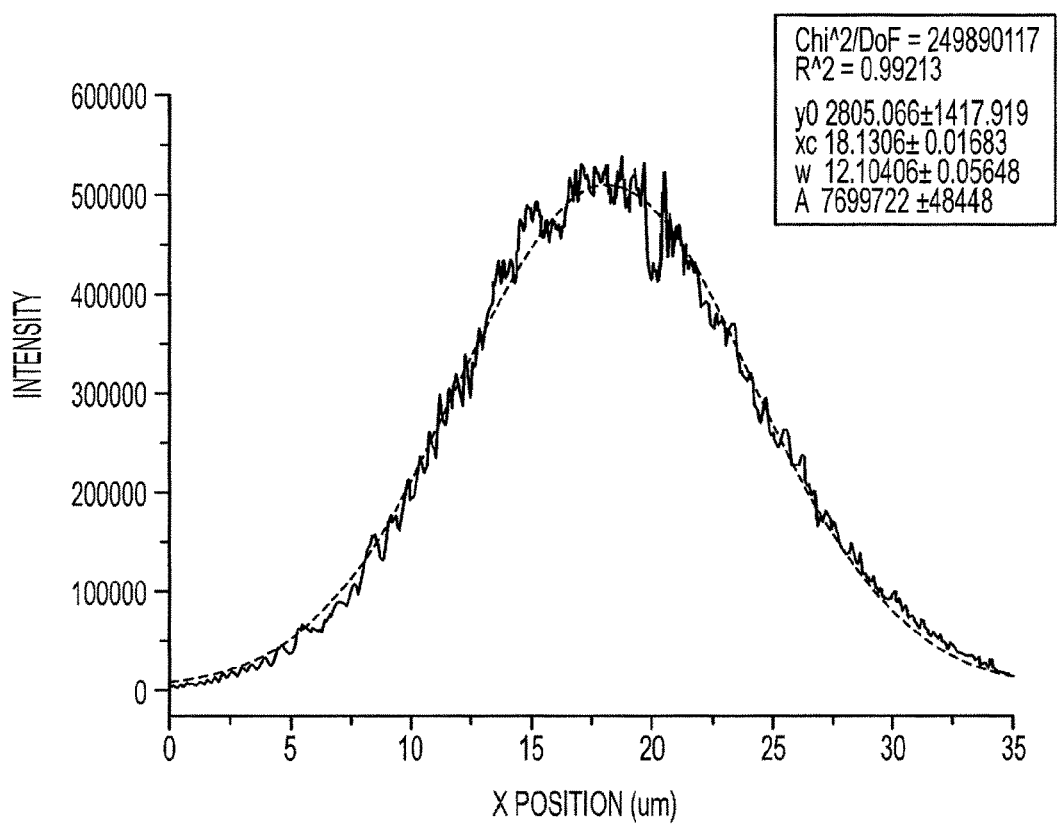
FIG. 6 shows image analysis of the 488-CICS illumination volume depicted in FIG. 5D before the confocal aperture. The sum of each column of pixels within the illumination volume is plotted as a function of the x-position. Before filtering with the aperture, the illumination follows a Gaussian profile with a $1/e^2$ radius of 12.1 μm. (Gaussian Fit: $y=y0+(A/(w*sqrt(PI/2)))*exp(-2*((x-xc)/w)^2)$.
Figure 7:
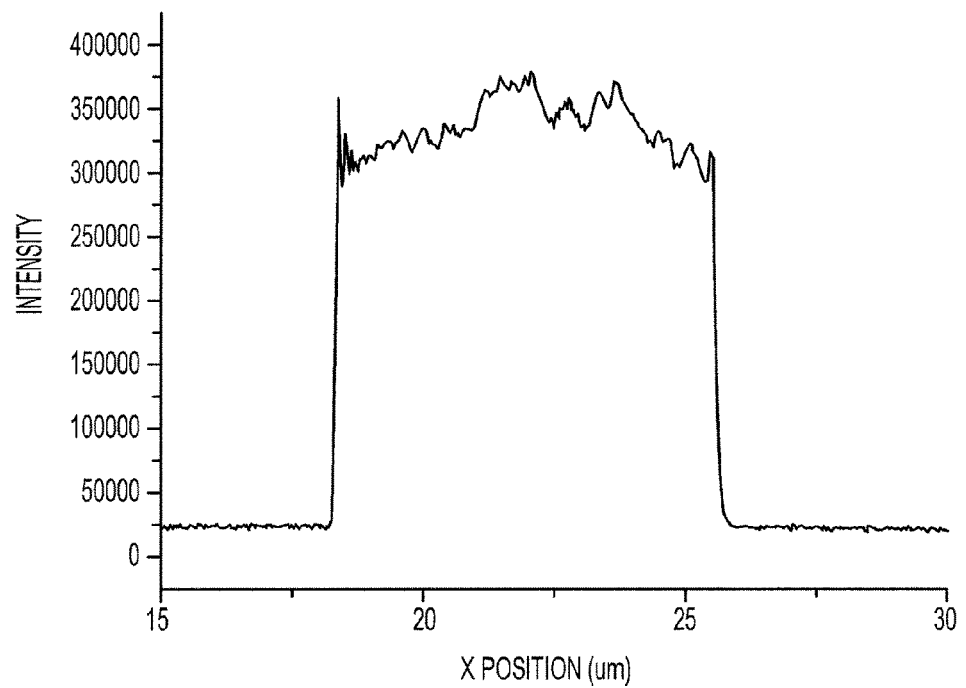
FIG. 7 shows image analysis of 488-CICS illumination volume depicted FIG. 5C after the confocal aperture. The sum of each column of pixels within the observation volume is plotted as a function of the x-position. After filtering with the aperture, light is collected from only the uniform center 7 μm.

The CICS system, on the other hand, shows a much larger, elongated observation volume that is fairly uniform in the center section. The OV profile of CICS mirrors that of traditional SMD in the y-($y_0$=0.25 µm) and z-directions ($z_0$=1.18 µm) but is elongated in the x direction ($x_{uniform}$~7 µm) as designed (see FIGS. 5). This is further illustrated in FIGS. 5B-5D where a CCD is used to take images of the standard SMD and CICS illumination volumes using a reflective interface held perpendicular to the optical axis. In FIG. 5B, the $1/e^2$ radius of the illumination volume in the x-direction (width) is stretched to 12.1 µm using an f=300 mm cylindrical lens (see FIG. 6). In FIG. 5C, a 620×115 µm confocal aperture limits light collection to only the center 7 µm where the illumination is most uniform (see FIG. 7). Over this region there is roughly a 6% RSD and 15% maximum variation in illumination intensity. Since the characteristic dimensions of the observation volume are larger than the 5×2 µm (w×h) microchannel used to transport molecules, near 100% mass detection efficiency is expected as theoretically predicted (Stavis, S. M., J. B. Edel, K. T. Samiee, and H. G. Craighead. 2005. Single molecule studies of quantum dot conjugates in a submicrometer fluidic channel. *Lab on a chip* 5:337-343). For analysis using 633-CICS, the confocal aperture was increased to 630×170 µm (w×h) to increase signal intensity and reduce the axial dependence of collection uniformity.

Despite the general agreement, the experimental CICS OV profile lacks the distinct plateau present in the theoretical simulations. This is expected as the sharp plateau is a limitation of the semi-geometric optics approximation used. In practice, the sharp cutoff in collection efficiency defined by the aperture is replaced by a smooth decay. In addition, the dependence of the OV profile in the z-dimension is much sharper than that predicted by the model. This can possibly be rectified through the use of a lower N.A. microscope objective or larger confocal aperture. Finally, there is additional non-uniformity introduced by diffraction, optical aberrations, mis-alignment, and experimental error that are not accounted for in the theoretical simulations. Similar point spread functions have recently been reported in confocal line scanning applications (Ralf, W., Z. Bernhard, and K. Michael. 2006. High-speed confocal fluorescence imaging with a novel line scanning microscope. *J. Biomed. Opt.* 11:064011; Dusch, E., T. Dorval, N. Vincent, M. Wachsmuth, and A. Genovesio. 2007. Three-dimensional point spread function model for line-scanning confocal microscope with high-aperture objective. *J. Microsc.* 228:132-138). Together, these effects increase the non-uniformity over theoretical predictions. Further improvements in uniformity can still be had through the incorporation of an objective with a higher degree of aberration correction, improved optical alignment, increased mechanical stability, and minor refinements in optical design.

DNA Analysis

Figure 8:
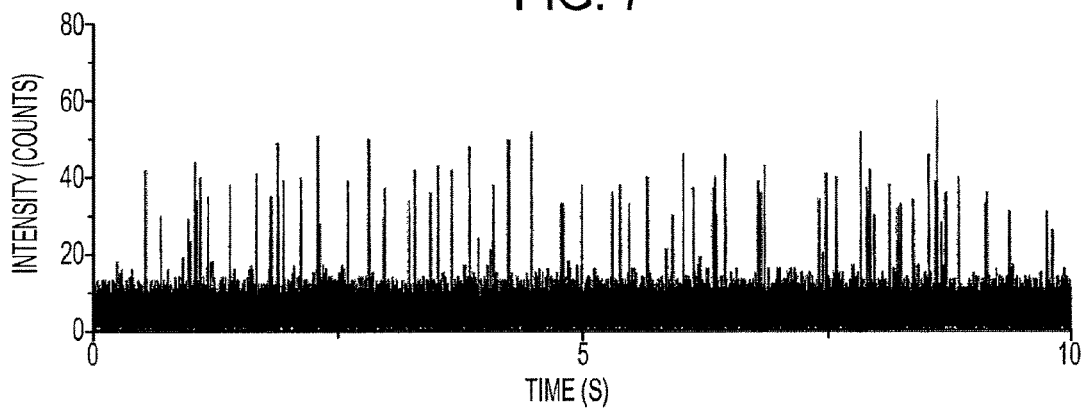
FIG. 8 shows single molecule trace data of PicoGreen stained pBR322 DNA taken using 488-CICS. The fluorescence bursts appear at a high rate and are highly uniform, but the background appears elevated due to the high amounts of background scatter from the silicon substrate. The bin time was 0.1 ms and 0.08 mW/cm2 of illumination power was used.

For the preliminary demonstration of CICS, analysis was performed on bright, multiply stained pBR322 DNA molecules. Initially, a silicon based microfluidic chip containing 5×2 µm microchannels was used to precisely transport molecules through the uniform 7×2 µm CICS observation volume. 488-CICS was first used to analyze PicoGreen stained pBR322 DNA. The experimental trace (see FIG. 8) is characterized by a large number of uniform fluorescence bursts and shows strong similarities to the simulated trace of FIG. 3B. It has a high burst rate of 1955 bursts/300s when a detection threshold of 22 counts is applied and average burst height of 33.0±10.4 counts (RSD=31%). However, accompanying the large increase in burst rate and uniformity is a substantial increase in background. The large increase in background is greater than that expected from the observation volume expansion alone. The close proximity of the glass-water interface at the top of the channel and the opaque silicon at the bottom of the 2 µm high microchannel creates large amounts of scattered light, significantly increasing background levels and leading to a low SBR of 6 (SBR=average burst height/average background). This scatter background is more effectively rejected by the smaller pinhole in standard SMD than the larger, rectangular aperture in CICS. In order to prevent the background from swamping out the fluorescent bursts, the illumination power was limited to only 0.08 mW/cm². Therefore, in the subsequent experiments a transition to a glass-PDMS device was made.

Figure 9:
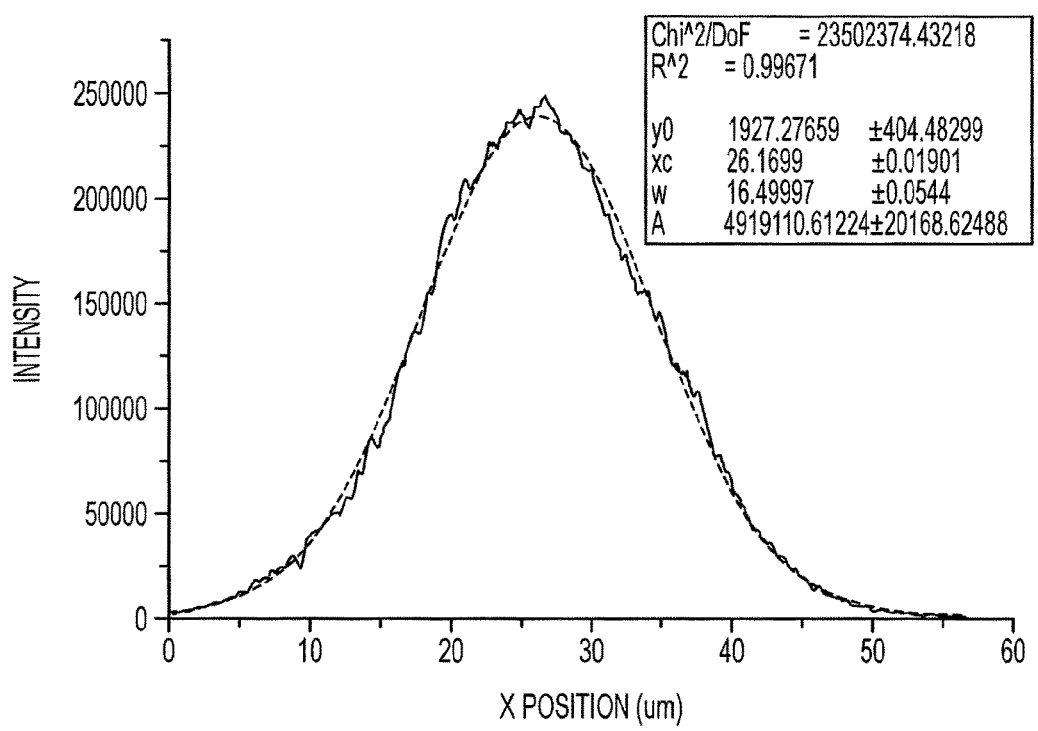
FIG. 9 shows image analysis of 633-QCS. The sum of each column of pixels within the illumination volume is plotted as a function of the x-position. Before filtering with the aperture, the illumination follows a Gaussian profile with a $1/e^2$ radius of 16.5 μm. This radius is approximately 30-fold greater than the $1/e^2$ radius of the diffraction limited 633-SMD illumination volume. (Gaussian Fit: $y=y0+(A/(w*sqrt(Pi/2)))*exp(-2*((x-xc)/w)^2)$.
Figure 10:
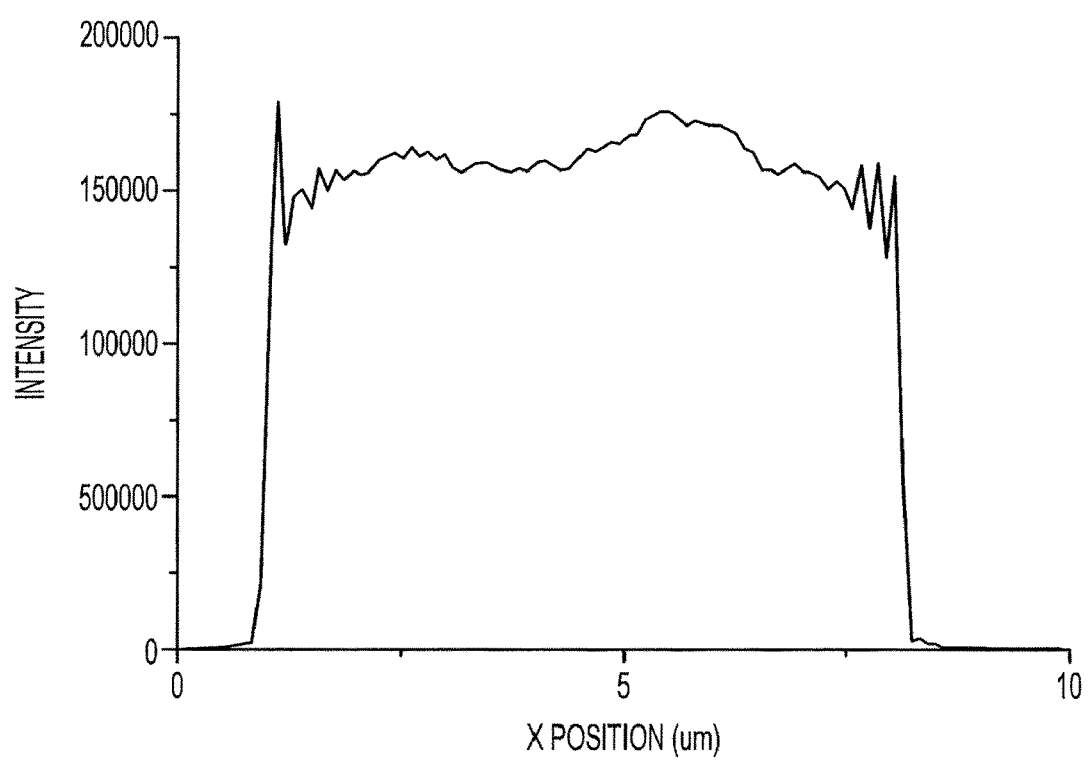
FIG. 10 shows image analysis 633-QCS. The sum of each column of pixels within the observation volume is plotted as a function of the x-position. After filtering with the aperture, light is collected from only the uniform center 7 μm.
Figure 17:
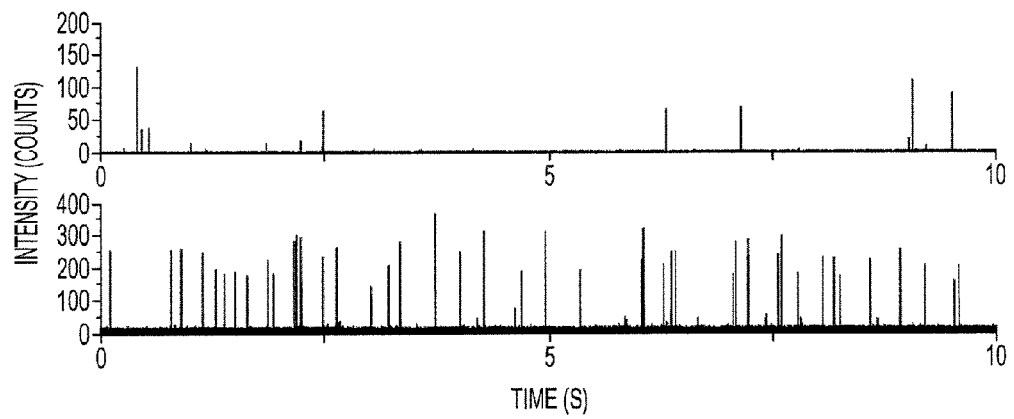
FIG. 17 shows experimental single molecule trace data of TOTO-3 stained pBR322 DNA taken using SMD (top) and CICS (bottom). The CICS experimental data shows a high burst rate and burst height uniformity that parallels the results of the Monte Carlo simulations. The bin time was 0.1 ms.

In order to compare CICS with SMD, a second microfluidic device of identical geometry to the first was fabricated out of PDMS and glass using soft-lithography. The transparent PDMS-glass materials have lower scatter background than the opaque silicon previously used. Red excitation (633 nm) with far red detection (670 nm) was found to have a lower average background and fewer spurious fluorescent bursts when used with PDMS devices than blue excitation (488 nm) with green detection (520 nm). It is believed that this can be attributed to the PDMS autofluorescence (Cesaro-Tadic, S., G. Dernick, D. Juncker, G. Buurman, H. Kropshofer, B. Michel, C. Fattinger, and E. Delamarche. 2004. High-sensitivity miniaturized immunoassays for tumor necrosis factor alpha using microfluidic systems. *Lab on a chip* 4:563-569; Piruska, A., I. Nikcevic, S. H. Lee, C. Ahn, W. R. Heineman, P. A. Limbach, and C. J. Seliskar. 2005. The autofluorescence of plastic materials and chips measured under laser irradiation. *Lab on a chip* 5:1348-1354; Yokokawa, R., S. Tamaoki, T. Sakamoto, A. Murakami, and S. Sugiyama. 2007. Transcriptome analysis device based on liquid phase detection by fluorescently labeled nucleic acid probes. *Biomedical microdevices* 9:869-875) as well as the large number of organic contaminants and impurities that fluoresce in green. As a result, TOTO-3 stained pBR322 DNA was analyzed rather than the previous PicoGreen stained DNA. The low scatter background enabled 633-CICS to be run at 1.85 mW/cm² rather than the low 0.08 mW/cm² previously used in 488-CICS. To achieve comparable illumination power densities at the observation region, 633-SMD was operated at 0.059 mW/cm² to account for the greater than 30× decrease in illumination volume size (see FIGS. 9 and 10). FIG. 17 shows two single molecule traces taken using 633-SMD (top) and 633-CICS (bottom). These traces closely resemble the Monte Carlo data in FIG. 3. The CICS traces show a higher burst rate, more uniform fluorescent bursts, and a slightly higher background than the SMD traces. Standard SMD, at a discrimination threshold of 10 counts, shows 336 bursts in a 300s period with an average burst height of 51.5±44.6 counts (RSD=87%). It is difficult, though, to set a threshold where both false negative and false positive bursts are minimized. Setting the threshold at the standard $\mu+3\sigma$ level, which gives a 99.7% confidence interval, would lead to an average of 9000 false positive peaks when acquiring data over a 300 s period with a 0.1 ms bin time. Thus, it is necessary to use a significantly higher threshold at the cost of an increased number of false negatives. Since there is no optimal threshold setting, it is difficult to determine the accuracy of the absolute burst rate and burst parameters.

Figure 11:
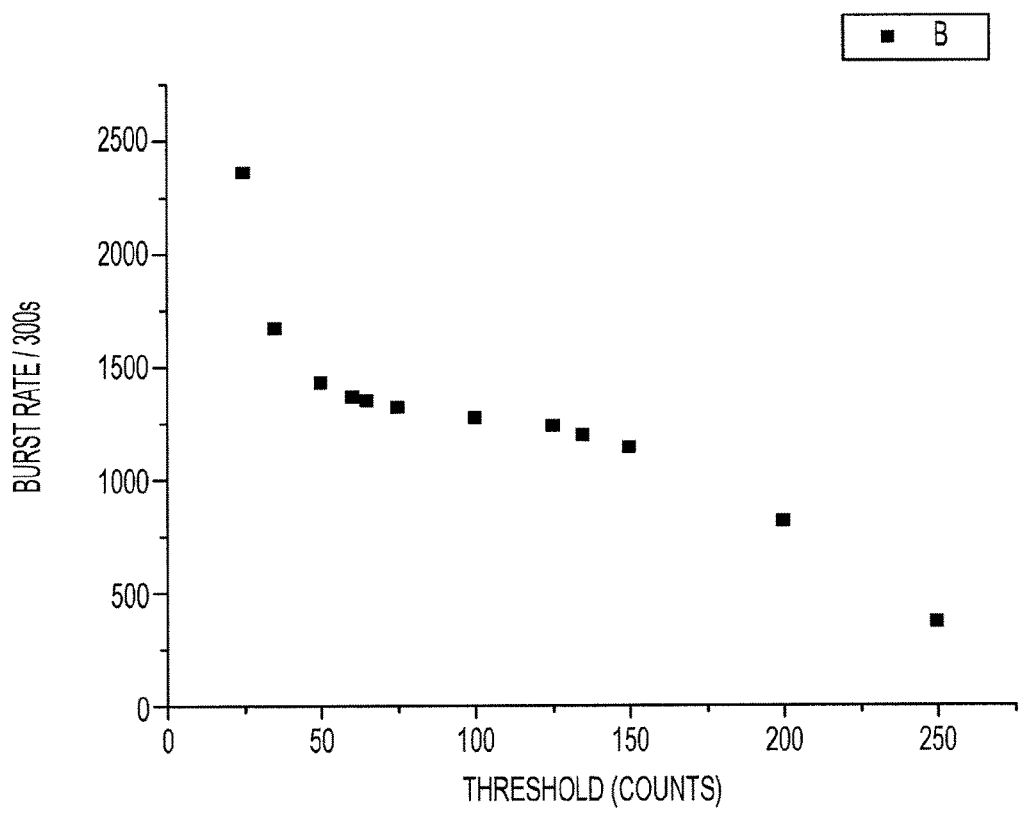
FIG. 11 shows threshold effects on burst rate in 633-CICS analysis of TOTO-3 in a 5×2 μm PDMS microchannel. CICS data is much less sensitive to thresholding artifacts. There is a flat region between thresh=65-125 where the burst rate remains fairly constant. The illumination power was 1.85 mW/cm$^2$, and the bin time was 0.1 ms.

CICS burst data, on the other hand, is much less sensitive to thresholding artifacts as predicted by the model. Using a threshold of 100 counts, 1278 fluorescent bursts were detected over a 300 s period where the average burst height was 211.6±56.6 counts (RSD=27%). When the threshold is varied over a wide range of 65-135 counts, the number of detected bursts decreases only 11% whereas in standard SMD the burst rate decreases by 44% over a much smaller range of 6-14 counts (see FIG. 11). The price to pay for the increased uniformity and burst rate is a correlated reduction in SBR. While the 633-CICS SBR of 22 is much improved over the previous 488-CICS results performed within the silicon devices due to the decreased scattering background in the PDMS devices, it is still less than SBR of 271 obtained using 633-SMD. This reduction in SBR using CICS is fairly consistent but slightly more than that expected from the ~7× linear expansion in observation volume size.

Since the channel dimensions of the silicon and PDMS devices are identical, the burst height uniformities are expected to be similar as is seen. However, they are approximately 10% greater than that which was theoretically predicted. Further uniformity improvements can be expected if the axial dependence (z-direction) is reduced through lower N.A. collection optics such as a 1.2 N.A. water immersion objective. The remainder of variability can be attributed to factors such as variability staining efficiency, fluctuations in the illumination intensity, instabilities in the flow velocity, and the Poiseuille flow profile.

Figure 12:
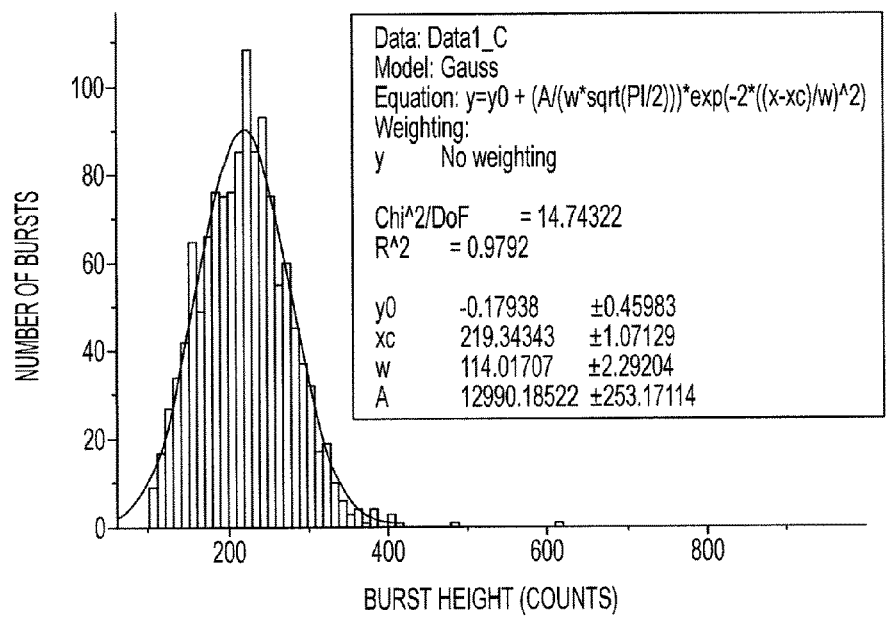
FIG. 12 is a burst height histogram of the CICS data presented in FIG. 9. The burst height histogram shows a sharp, well-defined Gaussian peak centered at 219 counts. Also depicted is a Gaussian curve-fit.

Two significant drawbacks of the PDMS devices that were not encountered using the silicon devices were frequent flow instabilities and long transient times when changing flow velocities. This can likely be attributed to the elastic nature of the PDMS and the less robust nature of the fluidic couplings. These effects become apparent as short time scale fluctuations in the burst rate (~seconds), longer time scale drift (~tens of minutes), and sudden spikes in burst rate. They are exacerbated by the intrinsic difficulty in controlling such low flow rates (0.001 μl/min) as well as the high flow resistance of the small microchannels. From the optical characterizations and simulations, it is evident that the 7×2 μm observation volume is sufficient to span the entire 5×2 μm microchannel. While based on the uniformity of the burst height histogram (see FIG. 12), it is evident that nearly all the molecules are flowing through the uniform center section of the observation volume. This implies that the large majority of molecules within the channel are in fact being detected. Thus, we believe the decreased burst rate can be largely attributed to flow variability.

Although the observation volume here was expanded ~7×, which corresponded to a roughly 10× decrease in SBR from standard SMD, it can be tailored to almost any size using the correct combination of cylindrical lens and aperture. The required signal-to-noise ratio and observation volume uniformity will dictate the maximum focal volume expansion that can be performed while maintaining adequate sensitivity.

Single Fluorophore Sensitivity

Figure 13:
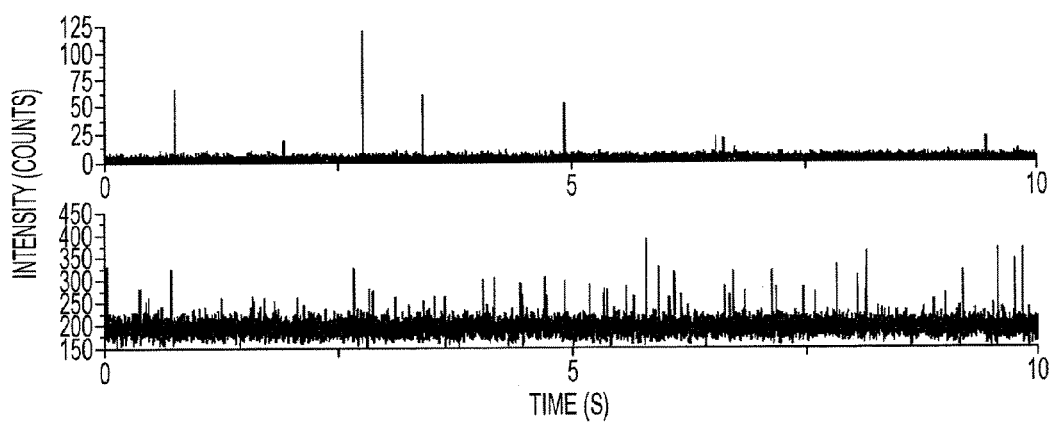
FIG. 13 is single molecule trace data of Cy5 labeled oligonucleotides taken using 633-SMD (top) and 633-CICS (bottom). Cy5 bursts can be clearly discriminated even above the high background. The background appears higher than the TOTO-3/pBR322 traces in FIG. 9 because of the longer bin time and higher excitation power. The bin time was 1 ms while 0.185 mW/cm$^2$ and 3.7 mW/cm$^2$ of illumination power was used for SMD and QCS, respectively.

CICS was tested to see if single fluorophore sensitivity was preserved despite the observation volume expansion. Cy5 labeled 24 by ssDNA was diluted to 1 pM, flowed through the PDMS microfluidic device, and analyzed using both traditional SMD and CICS. CICS was run at 3.7 mW/cm² while SMD was performed at 0.185 mW/cm². A longer photon binning time (1 ms vs. 0.1 ms) was used in the single fluorophore Cy5 experiments to increase signal levels. When standard SMD is performed within a large capillary, Cy5 fluorophores can be detected with a SBR of 13 and 89% RSD in burst height (threshold=8 counts, average burst height=18.0±16.1 counts). Whereas when standard SMD is performed within the microchannel, the scatter background is increased due to the close proximity of the glass-water and water-PDMS interfaces resulting in a slightly reduced SBR of 10 (see FIG. 13) while burst height RSD remains at a comparable 90% (average burst height=36.7±32.9 counts) when a threshold of 14 is applied. In comparison, CICS is significantly more uniform (see FIG. 13). The average Cy5 burst height was 120.8±58.9 counts, which corresponds to a RSD of 49% (threshold=254 counts). This burst uniformity is expected to be decreased when compared to the pBR burst uniformity because of the decreased brightness of the single Cy5 fluorophore. CICS showed an SBR of 1.6 which was 6× lower than the standard SMD SBR, consistent with the 7× increase in observation volume size. This illustrates the trade-off in uniformity, burst rate, and SBR that can be easily predicted and engineered using CICS. For single fluorophore analysis, the current 7×2 µm OV/5×2 µm microchannel combination is likely the largest expansion that can be performed while retaining single fluorophore sensitivity. But for brighter molecules such as fluorescent beads, quantum dots, or multiply labeled DNA or proteins, it is expected that even larger microchannels may be used for increased throughput.

Single Fluorophore Mass Detection Efficiency

Figure 14:
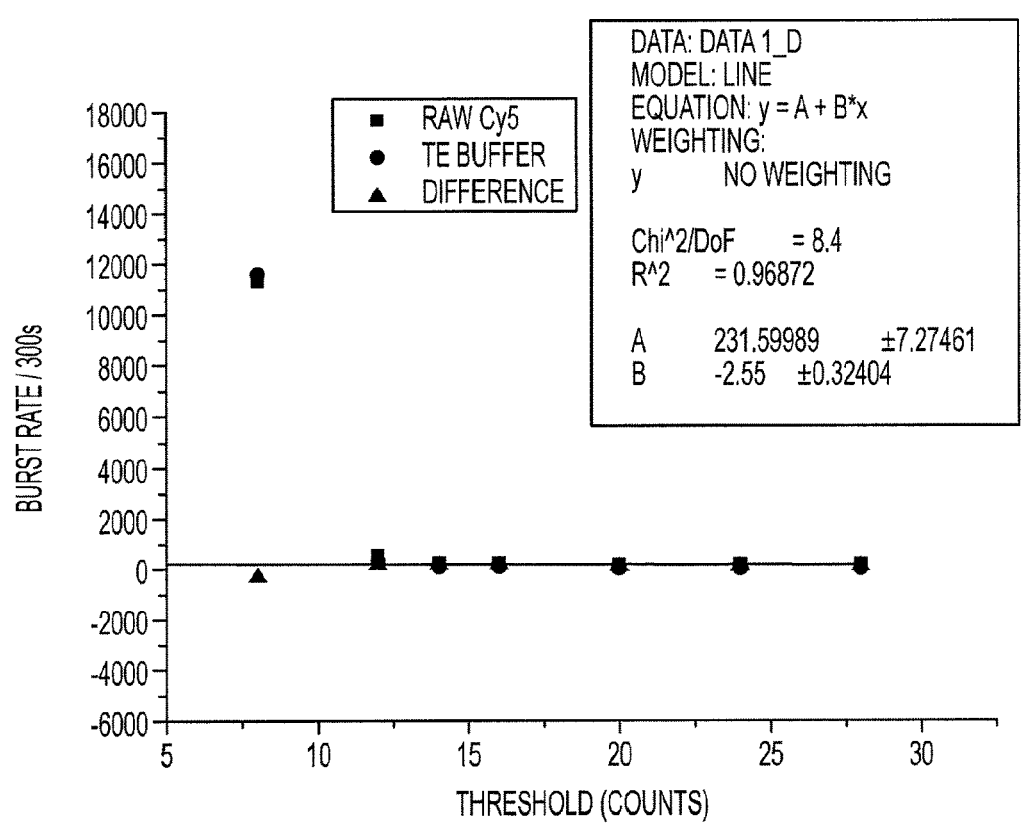
FIG. 14 shows threshold effects on burst rate in 633-SMD analysis of Cy5 in a 5×2 μm PDMS microchannel. As the threshold is increased, the burst rate first increases slowly and then increases sharply as the number of false negative bursts rises sharply. A linear fit is applied to the points at t=16, 20, 24 and 28 and used to extrapolate the number of detected bursts if the threshold was set to 0. The illumination power was 0.185 mW/cm$^2$, and a 1 ms bin time was used.
Figure 15:
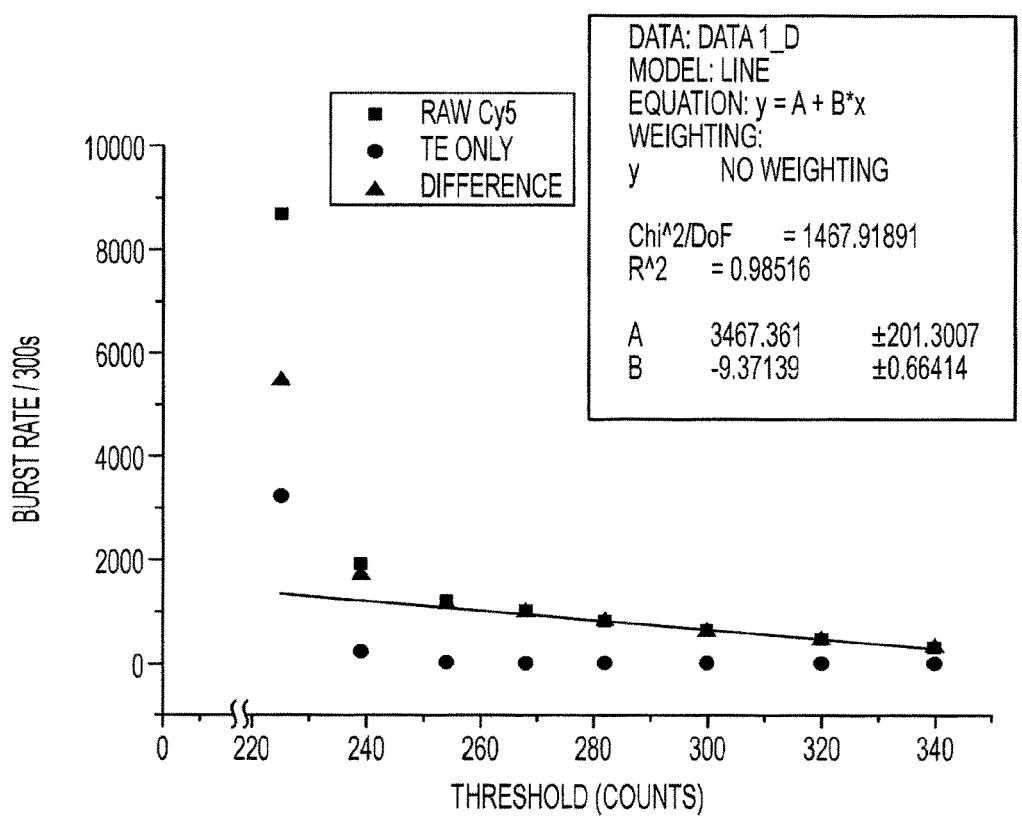
FIG. 15 shows threshold effects on burst rate in 633-CICS analysis of Cy5 in a 5×2 μm PDMS microchannel. A linear fit is applied to the points at t=268, 282, 300, 320, and 340 and used to extrapolate the number of detected bursts if the threshold was set to 0. The illumination power was 3.7 mW/cm$^2$, and the bin time was 1 ms.

As previously discussed, single Cy5 fluorophores are readily detected by both standard SMD and CICS. The estimation of mass detection efficiency requires an accurate determination of the absolute burst rate, which is in turn highly influenced by the specific threshold applied. The optimal threshold balances the proportion of false positive bursts against the proportion of false negative bursts in the attempt to minimize the influence of both. However, when analyzing dim molecules such as single fluorophores where the fluorescent fluctuations are not fully resolved from the background fluctuations (i.e. the distribution of fluorescent fluctuations overlaps the distribution of background fluctuations), this becomes extremely difficult since every threshold chosen will introduce an inordinate number of either false positives or false negatives. We adapt the method of Huang et al. to extrapolate the true burst rate from that determined after thresholding (Huang, B., H. K. Wu, D. Bhaya, A. Grossman, S. Granier, B. K. Kobilka, and R. N. Zare. 2007. Counting low-copy number proteins in a single cell. *Science* 315:81-84). Given the applied flow rate (0.001 µl/min) and nominal concentration (1 pM), an average of ~3011 molecules are expected to flow through the channel during each 300s period. Using standard SMD, 232 molecules can be detected leading to a mass detection efficiency of 7.5% (see FIG. 14). This burst rate appears somewhat lower than expected. Under CICS analysis, on the other hand, 3467 molecules can be detected (see FIG. 15). Although this number is slightly greater than the expected number of molecules, this difference may be attributed to errors in flow rate due to pump calibration, instabilities in flow as previously discussed, pipetting errors in sample preparation, and inaccuracies in the data analysis method.

Figure 16:
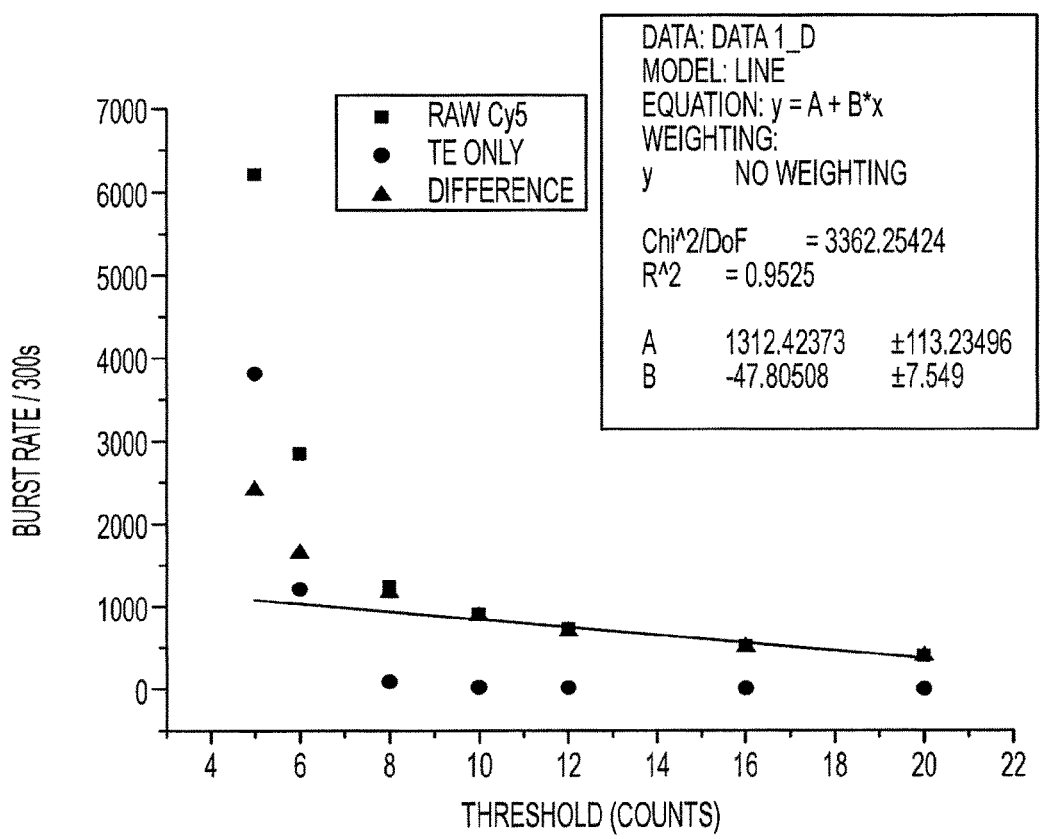
FIG. 16 shows threshold effects on burst rate in 633-SMD analysis of Cy5 in a 100 μm ID silica microcapillary. A linear fit is applied to the points at t=10, 12, 16 and 20 and used to extrapolate the number of detected bursts if the threshold was set to 0. 1312 molecules were detected while $3 \times 10^6$ molecules are expected based on the 1 μl/min flow rate, 1 pM concentration, and 300s data acquisition time. This leads to a mass detection efficiency of 0.04%. The illumination power was 0.185 mW/cm$^2$, and the bin time was 1 ms.

The large mass detection efficiency increase in CICS is achieved through the combination of two effects, a decrease in the size of the transport channel and a matched 1-D increase in observation volume size. Standard SMD mass detection efficiencies (<1%) are low since the transport channel (diameter~100 µm) is typically much larger than the SMD observation volume (diameter~1 µm). Since the mass detection efficiency describes the relative proportion of detected molecules, a reduction in transport channel size increases mass detection efficiency without a concurrent increase in burst rate while an increase in observation volume size increases both mass detection efficiency and burst rate. As the channel size is reduced to below the observation volume size, the mass detection efficiency is maximized while the absolute burst rate is progressively reduced. Using the previous method, standard SMD performed in a 100 µm diameter capillary achieves a mass detection efficiency of only 0.04% (see FIG. 16). By substituting a 5×2 µm microchannel, the mass detection efficiency is increased to 7.5% while the absolute burst rate is actually reduced by 5× since the low microchannel height limits the effective size of the observation volume. This 7.5% roughly correlates to the overlap in cross-sectional area between the SMD observation volume size and the microchannel, but is slightly lower than the 10-15% expected, likely due to flow instabilities, a slight misalignment of the channel to the observation volume, and inaccuracy in the estimation method. To increase mass detection efficiency to near 100% using standard SMD, a nanochannel must be used (Stavis, S. M., J. B. Edel, K. T. Samiee, and H. G. Craighead. 2005. Single molecule studies of quantum dot conjugates in a submicrometer fluidic channel. *Lab on a chip* 5:337-343). However, CICS further increases mass detection efficiency by matching the 5×2 µm microchannel with an optimized 1-D observation volume expansion. This leads to a 15× increase in absolute burst rate over standard SMD in a microchannel and near 100% mass detection efficiency. The observation volume in CICS can be easily tailored to span a given channel geometry with the correct choice of optics and aperture using the methods previous described.

Burst Size Distribution Analysis (BSDA)

Figure 18:
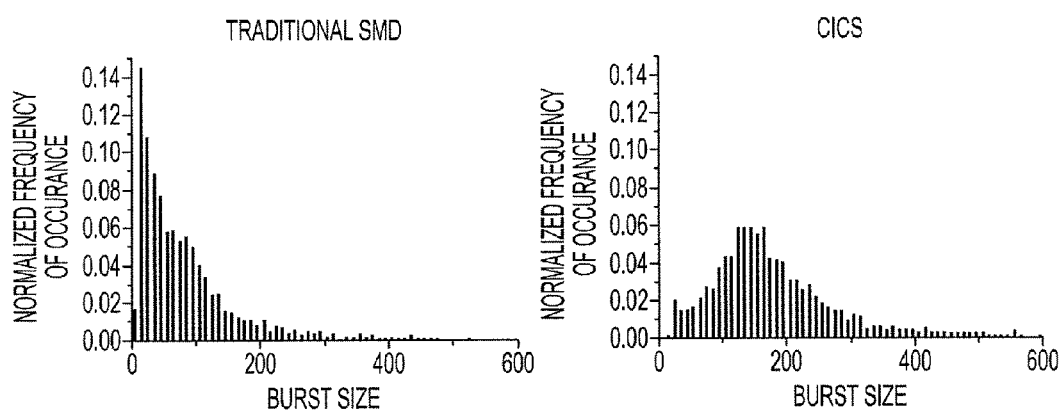
FIG. 18 shows BSDA histograms of PicoGreen stained pBR322 DNA taken using standard SMD (left) and CICS (right). In standard SMD, the DNA peak is not resolved from the noise fluctuations due to the Gaussian OV profile whereas CICS shows a clearly discernable peak due to the high uniformity of the OV profile.

Not only is CICS more accurate in quantification and burst parameter determination, the greatly enhanced uniformity enables single molecule assays that cannot be performed using traditional SMD. For example, burst size distribution analysis uses the distribution of individual fluorescence burst intensities to determine the size of a molecule. As shown in FIG. 18, the Gaussian OV profile of standard SMD does not allow a clear distinction of the pBR DNA population from the background fluctuations. However, the same DNA shows a clear population centered around 151 counts when analyzed using CICS. Thus, the average burst size can be more accurately determined without being skewed by background fluctuations. In fact, the digital fluorescence bursts even obviate the need for smoothing algorithms such as Lee filtering when processing such data (Enderlein, J., D. L. Robbins, W. P. Ambrose, P. M. Goodwin, and R. A. Keller. 1997. The statistics of single molecule detection: An overview. *Bioimaging* 5:88-98). Using CICS, it is possible to perform a burst size distribution assay on a mixture of DNA molecules and individually identify the constituents of that mixture as well as their individual concentrations. Such an assay would be impossible using standard SMD.

Through careful modeling and implementation, CICS has been engineered to alleviate the subtle shortcomings of traditional SMD that make it difficult to apply in a widespread manner. CICS significantly enhances uniformity and mass detection efficiency while still preserving single fluorophore sensitivity, allowing more accurate and precise determination of single molecule parameters than traditional SMD. It can be operated with higher throughput and with less complication than competing technologies using molecular focusing and molecular confinement. In addition, its quantification accuracy is further reinforced by its robustness against thresholding artifacts. Finally, because CICS uses an epi-fluorescent arrangement, it is easily used with essentially all types of microfluidic devices including those with opaque substrates such as silicon. This makes it an ideal detection platform that can be generically combined with all microfluidic systems. Since the mass detection efficiency, detection uniformity, and signal-to-noise ratio can be accurately predicted, it can be easily optimized for any microfluidic channel size and application. CICS has great potential in applications such as clinical diagnostics, biochemical analysis, and biosensing where accurate quantification of the molecular properties of rare biomolecules is necessary.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is intended, therefore, that the invention be defined by the scope of the

We claim:

1. A cylindrical illumination confocal spectroscopy system, comprising:
a fluidic device having a fluid channel defined therein;
an objective lens unit arranged proximate said fluidic device;
an illumination system in optical communication with said objective lens unit to provide light to illuminate a sample through said objective lens unit; and
a detection system in optical communication with said objective lens unit to receive at least a portion of light that passes through said objective lens unit from said sample,
wherein said illumination system comprises a beam-shaping lens unit constructed and arranged to provide a substantially planar illumination beam that subtends across, and is longer than, a lateral dimension of said fluid channel, said substantially planar illumination beam having a diffraction limited thickness in a direction substantially orthogonal to said lateral dimension of said fluid channel,
wherein said substantially planar illumination beam incident upon said fluidic device has a width that is substantially longer than the lateral dimension of said fluid channel such that said substantially planar illumination beam has an illumination intensity that is uniform across said lateral dimension of said fluid channel to within ±10%,
wherein said detection system comprises an aperture stop defining a substantially rectangular aperture having a longitudinal dimension and a transverse dimension,
wherein said aperture stop is arranged so that the substantially rectangular aperture is confocal with an illuminated portion of said fluid channel such that said transverse dimension of said substantially rectangular aperture substantially subtends said lateral dimension of said fluid channel without extending substantially beyond said fluid channel and allows light to pass from only a uniform excitation region while occluding light from outside said uniform excitation region, and said lateral dimension of said substantially rectangular aperture substantially matches said diffraction limited thickness of said planar illumination beam.

2. A cylindrical illumination confocal spectroscopy system according to claim 1, wherein said beam-shaping lens unit comprises a cylindrical lens.

3. A cylindrical illumination confocal spectroscopy system according to claim 1, wherein said illumination system further comprises a source of substantially monochromatic light of a wavelength selected to interact in a detectable way with a sample when it flows through said substantially planar illumination beam in said fluid channel while in operation.

4. A cylindrical illumination confocal spectroscopy system according to claim 3, wherein said illumination system further comprises a second source of substantially monochromatic light of a second wavelength selected to interact in a detectable way with a sample when it flows through said substantially planar illumination beam in said fluid channel while in operation.

5. A cylindrical illumination confocal spectroscopy system according to claim 4, wherein said illumination system further comprises an optical fiber optically coupled to said first and second optical sources to simultaneously transmit said substantially monochromatic light of both said first and said second wavelengths.

6. A cylindrical illumination confocal spectroscopy system according to claim 3, wherein said detection system further comprises a detector adapted to detect light from said sample responsive to said substantially monochromatic light from said illumination system.

7. A cylindrical illumination confocal spectroscopy system according to claim 6, wherein said detection system further comprises a filter adapted to hinder light of predetermined wavelengths from reaching said detector.

8. A cylindrical illumination confocal spectroscopy system according to claim 7, wherein said filter is a bandpass filter having a passband centered about a predetermined detection wavelength.

9. A cylindrical illumination confocal spectroscopy system according to claim 4, wherein said detection system further comprises a first detector adapted to detect light from said sample responsive to said substantially monochromatic light from said illumination system at said first wavelength and a second detector adapted to detect light from said sample responsive to said substantially monochromatic light from said illumination system at said second wavelength.

10. A cylindrical illumination confocal spectroscopy system according to claim 6, wherein said detection system further comprises a signal processing system in communication with said detector to receive a signal corresponding to detected light, wherein said signal processing system is adapted to process said signal in quantized thresholds.

11. A cylindrical illumination confocal spectroscopy system according to claim 1, wherein said rectangular aperture of said aperture stop is less than 30% of the area of said substantially planar illumination beam incident upon said fluidic device.

12. A cylindrical illumination confocal spectroscopy system according to claim 1, wherein said the width of said planar illumination beam is at least four times greater than said lateral dimension of said fluid channel.

13. A cylindrical illumination confocal spectroscopy system according to claim 1, wherein said fluid channel has a width less than about 10 µm and a depth less than about 3 µm.

14. A cylindrical illumination confocal spectroscopy system according to claim 1, wherein said fluid channel has a width less than about 25 µm and a depth less than about 5 µm.

15. A cylindrical illumination confocal spectroscopy system according to claim 1, wherein said fluid channel has a width less than about 5 µm and a depth less than about 1 µm.

16. A cylindrical illumination confocal spectroscopy system according to claim 1, wherein a detection efficiency of said cylindrical illumination confocal spectroscopy system for detecting molecules flowing through said fluidic channel is at least 50%.

17. A cylindrical illumination confocal spectroscopy system according to claim 1, wherein a detection efficiency of said cylindrical illumination confocal spectroscopy system for detecting molecules flowing through said fluidic channel is at least 80%.

18. A cylindrical illumination confocal spectroscopy system according to claim 1, wherein a detection efficiency of said cylindrical illumination confocal spectroscopy system for detecting molecules flowing through said fluidic channel is at least 90%.

19. A cylindrical illumination confocal spectroscopy system according to claim 1, wherein a maximum optical detection variability of said cylindrical illumination confocal spectroscopy system for detecting molecules flowing through said fluidic channel is less than 5%.

20. A cylindrical illumination confocal spectroscopy system according to claim 1, wherein a maximum optical detection variability of said cylindrical illumination confocal spectroscopy system for detecting molecules flowing through said fluidic channel is less than 20%.

21. A cylindrical illumination confocal spectroscopy system according to claim 1, wherein a maximum optical detection variability of said cylindrical illumination confocal spectroscopy system for detecting molecules flowing through said fluidic channel is less than 40%.

22. A cylindrical illumination confocal spectroscopy system according to claim 1, wherein said substantially planar illumination beam is incident upon said fluidic device at said fluid channel in a direction that is substantially orthogonal to a direction of fluid flow through said fluid channel.

23. A method of detecting molecules, comprising:
causing a fluid with molecules to be detected to flow through a channel of a fluidic device;
illuminating a portion of said fluid flowing through said channel substantially uniformly with a sheet-like beam of light;
directing light from said molecules to be detected through a substantially rectangular aperture of an aperture stop to be detected; and
detecting said molecules based on light directed through said substantially rectangular aperture,
wherein said substantially rectangular aperture is constructed and arranged to substantially match a width of said channel in one dimension and to substantially match a diffraction limited thickness of said sheet-like illumination beam in another dimension.

24. A method of detecting molecules according to claim 23, wherein said detecting said molecules comprise correlating substantially quantized light pulses with a number of molecules detected.

* * * * *

```
                              SEQUENCE LISTING

<160> NUMBER OF SEQ ID NOS: 1

<210> SEQ ID NO 1
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
aagggattcc tgggaaaact ggac                                              24
```